United States Patent
Wiegand et al.

(10) Patent No.: US 12,532,798 B2
(45) Date of Patent: Jan. 27, 2026

(54) FLUID APPLICATOR FOR TRENCH CLOSING ASSEMBLY

(71) Applicant: Precision Planting LLC, Tremont, IL (US)

(72) Inventors: John Wiegand, Goodfield, IL (US); Ian Radtke, Washington, IL (US); Jason J. Stoller, Eureka, IL (US)

(73) Assignee: Precision Planting LLC, Tremont, IL (US)

( * ) Notice: Subject to any disclaimer, the term of this patent is extended or adjusted under 35 U.S.C. 154(b) by 723 days.

(21) Appl. No.: 17/822,904

(22) Filed: Aug. 29, 2022

(65) Prior Publication Data

US 2024/0065134 A1    Feb. 29, 2024

(51) Int. Cl.
*A01C 5/06* (2006.01)
*A01C 23/04* (2006.01)

(52) U.S. Cl.
CPC ............ *A01C 5/068* (2013.01); *A01C 23/047* (2013.01)

(58) Field of Classification Search
CPC ........ A01C 23/047; A01C 5/066; A01C 5/068
See application file for complete search history.

(56) References Cited

U.S. PATENT DOCUMENTS

| | | | |
|---|---|---|---|
| 2,988,025 A * | 6/1961 | Johnston | A01C 23/025 239/172 |
| 3,799,079 A | 3/1974 | Dietrich | |
| 4,023,507 A | 5/1977 | van der Lely | |
| 2002/0195033 A1 * | 12/2002 | Schaffert | A01C 23/025 111/189 |
| 2004/0255834 A1 * | 12/2004 | Schaffert | A01C 5/062 111/200 |
| 2005/0045080 A1 | 3/2005 | Halford et al. | |
| 2005/0263053 A1 * | 12/2005 | Schaffert | A01C 5/062 111/189 |
| 2009/0235853 A1 * | 9/2009 | Schaffert | A01C 7/06 111/163 |
| 2012/0137942 A1 * | 6/2012 | Nikkel et al. | A01C 5/062 111/121 |
| 2013/0074747 A1 * | 3/2013 | Schaffert et al. | A01C 7/201 111/163 |
| 2013/0263767 A1 * | 10/2013 | Trevino et al. | A01C 5/066 111/121 |
| 2016/0135364 A1 * | 5/2016 | Schaffert | A01C 23/028 111/127 |
| 2017/0034993 A1 * | 2/2017 | Andrews et al. | A01C 5/064 |
| 2017/0208736 A1 * | 7/2017 | Schaffert et al. | A01C 5/068 |
| 2019/0075710 A1 | 3/2019 | Strnad et al. | |
| 2020/0352089 A1 | 11/2020 | Kaiser et al. | |

FOREIGN PATENT DOCUMENTS

| | | | | |
|---|---|---|---|---|
| CA | 2690360 A1 | 7/2011 | | |
| CN | 107750530 A | 3/2018 | | |
| RU | 2731510 C2 * | 9/2020 | | A01B 9/005 |

(Continued)

OTHER PUBLICATIONS

Levy et al., machine translation of Russian patent No. 2,731,510 C2 (Sep. 3, 2020). (Year: 2020).*

(Continued)

*Primary Examiner* — Tara Mayo

(57) ABSTRACT

A trench closing assembly including a fluid applicator.

8 Claims, 22 Drawing Sheets

(56) References Cited

FOREIGN PATENT DOCUMENTS

WO   WO-2019040414 A1 *  2/2019  ........... A01C 23/023
WO       2020/208442 A1    10/2020

OTHER PUBLICATIONS

UK Intellectual Property Office, Search report for related UK Application No. GB2004249.5, dated Nov. 12, 2020.
European Patent Office, International Search Report related to International Patent Application No. PCT/IB2021/050571, mail date May 7, 2021.
"Clamp." Merriam-Webster.com Dictionary, Merriam-Webster, https://www.merriam-webster.com/dictionary/clamp. Accessed Aug. 19, 2025.
"Clamp." Britannica.com Dictionary, Britannica, https://www.britannica.com/dictionary/clamp. Accessed Aug. 19, 2025.

* cited by examiner

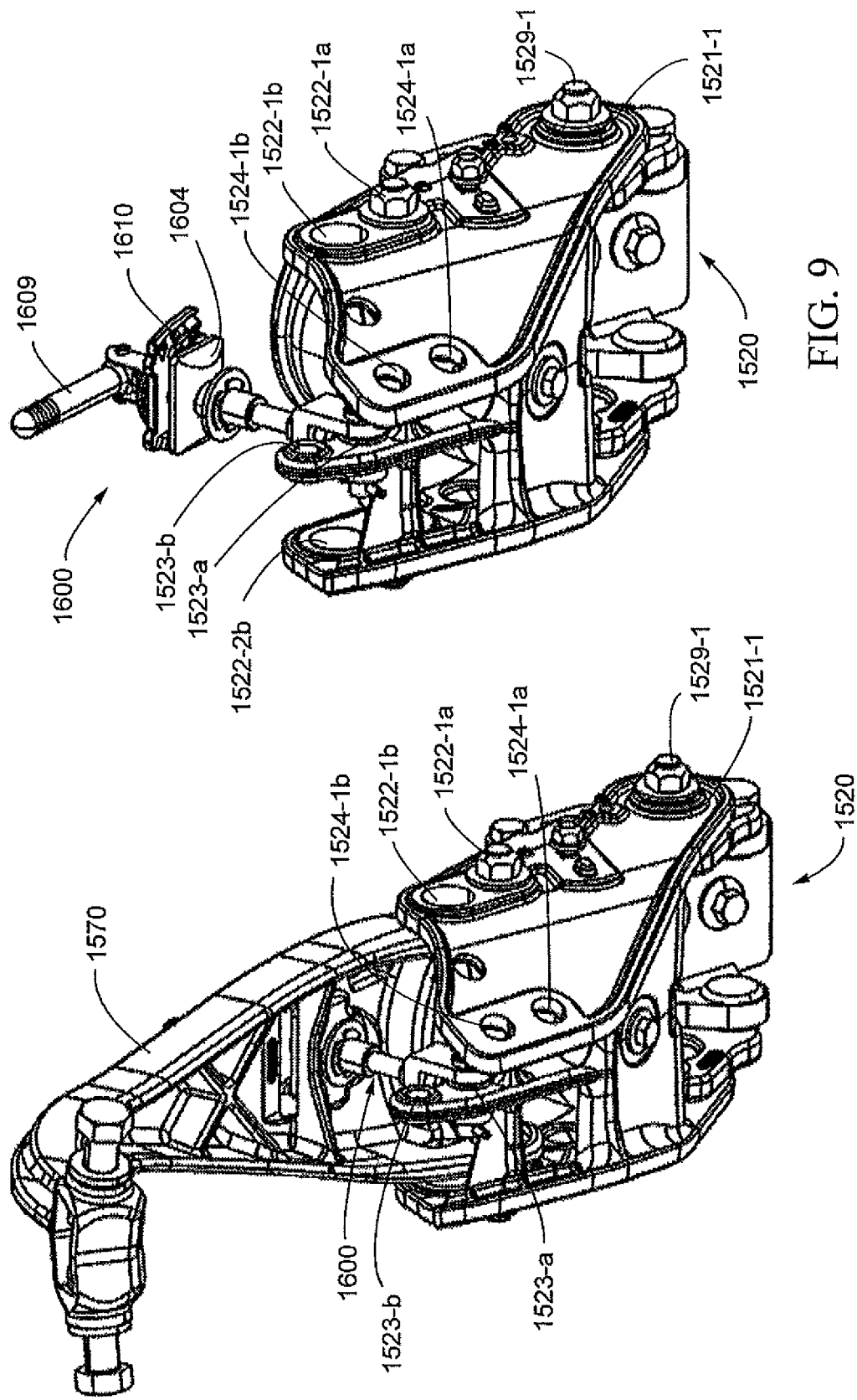

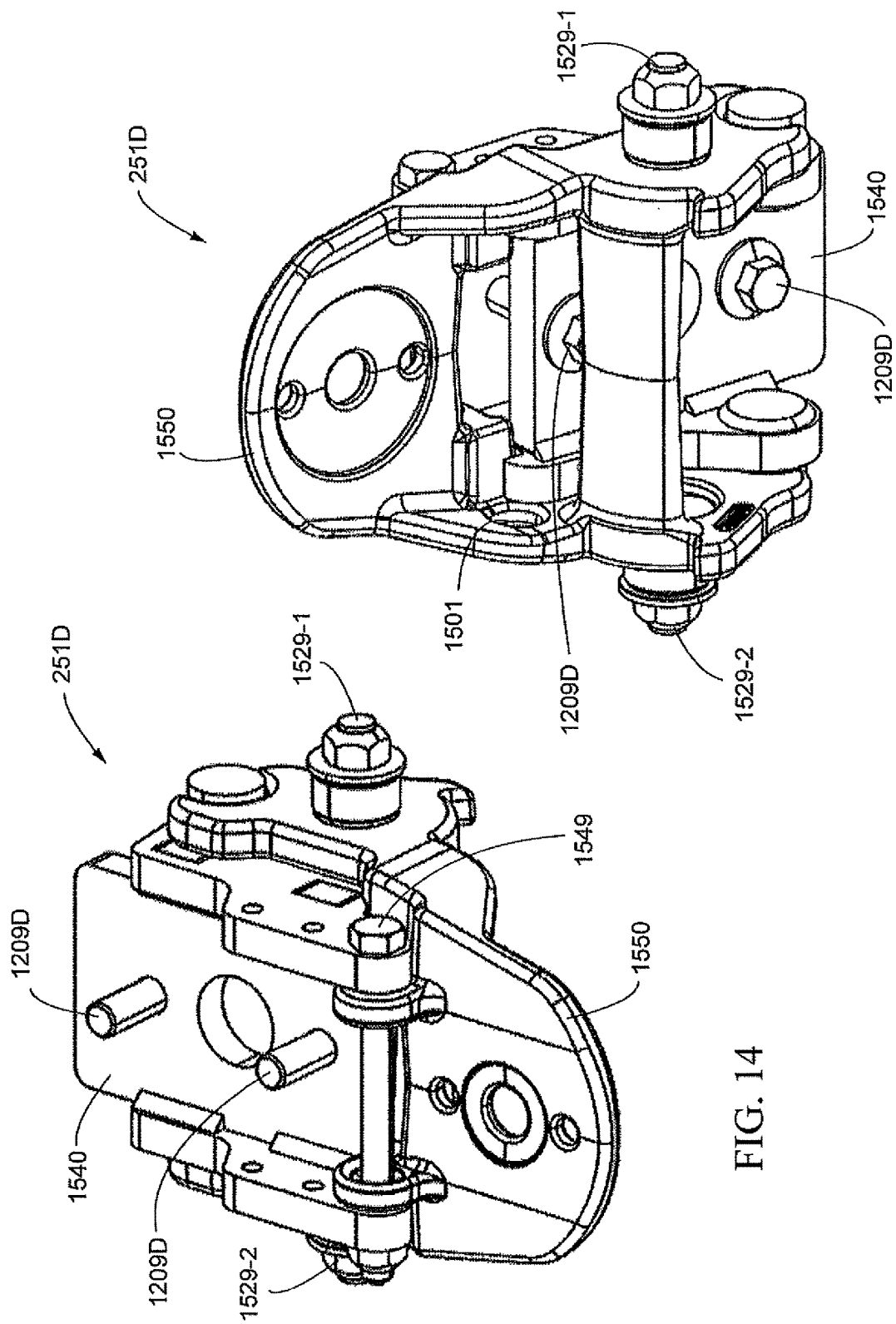

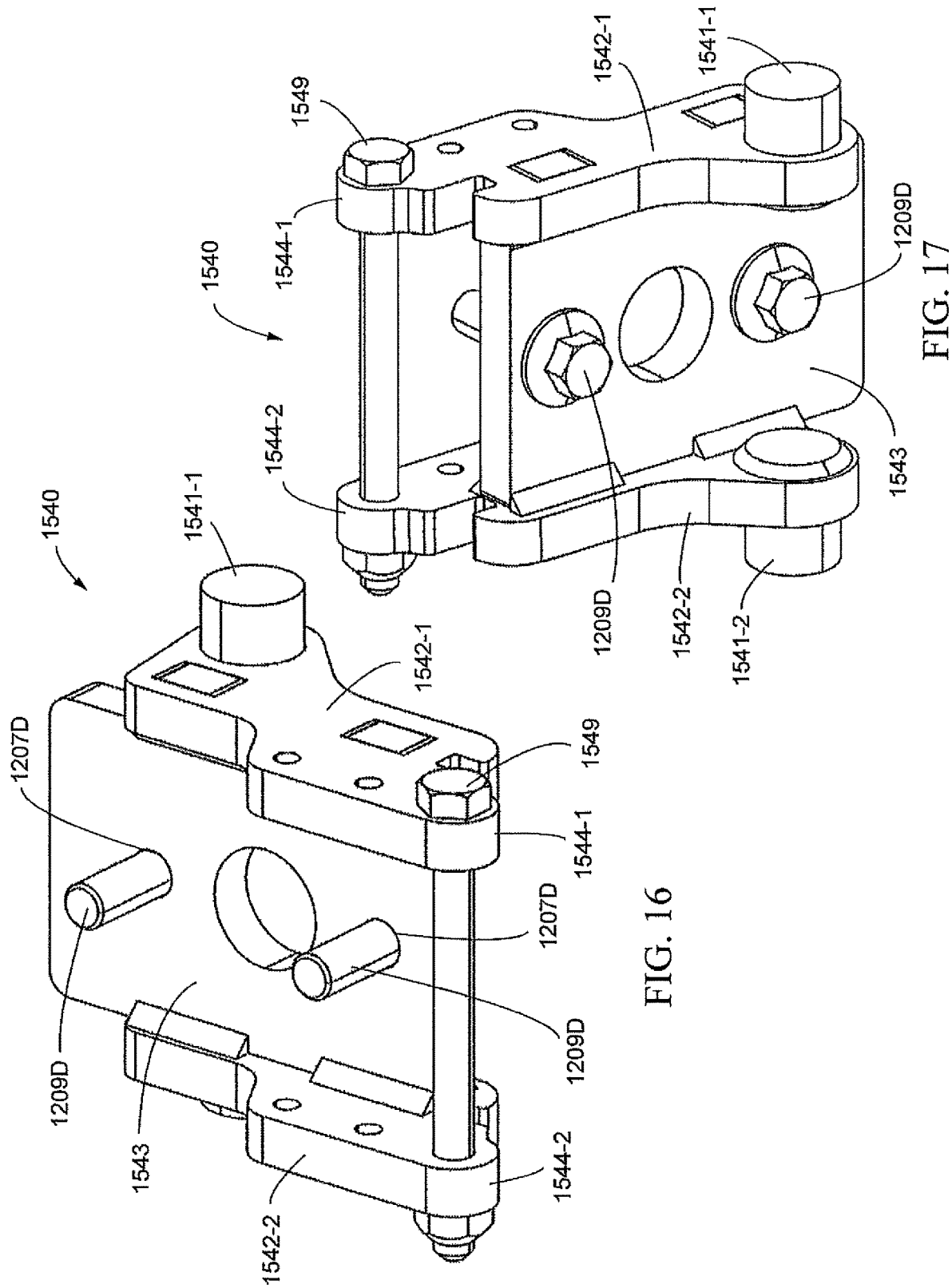

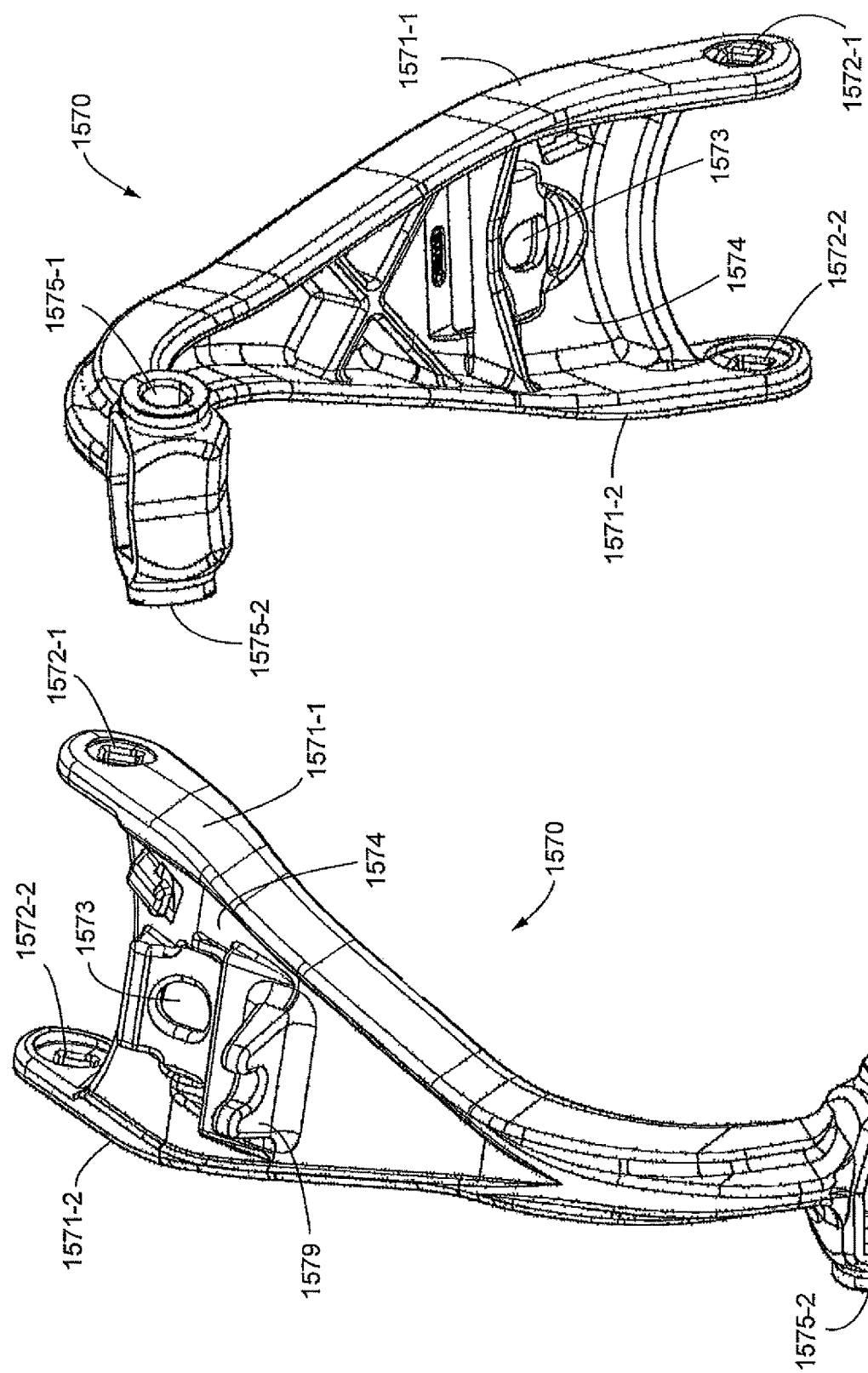

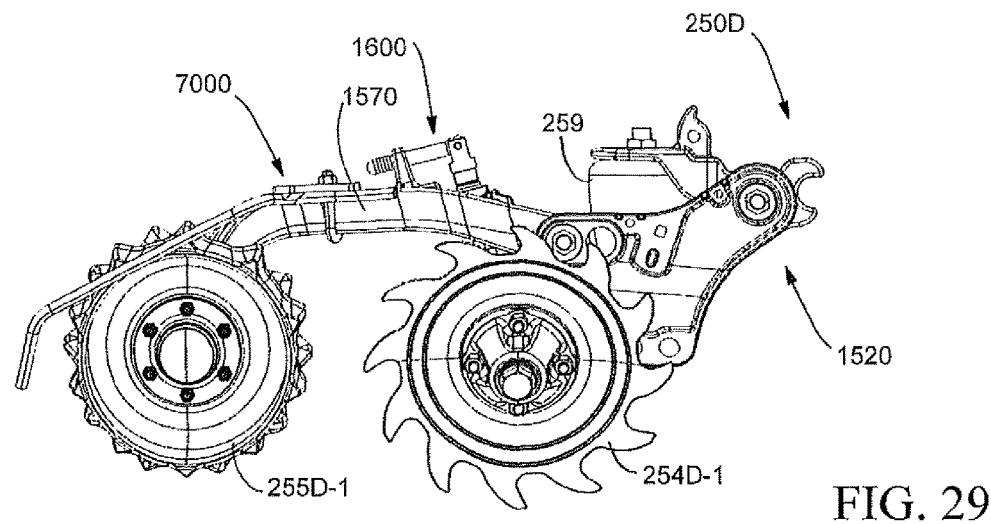
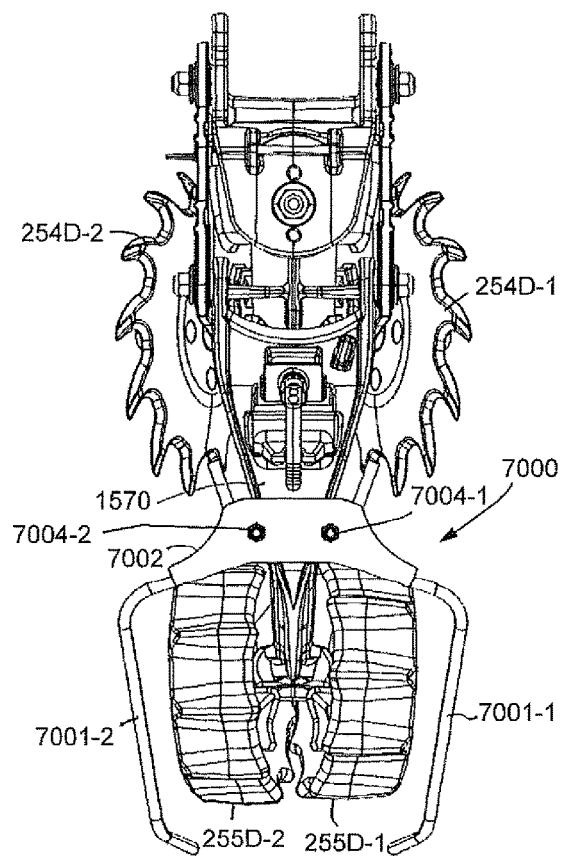
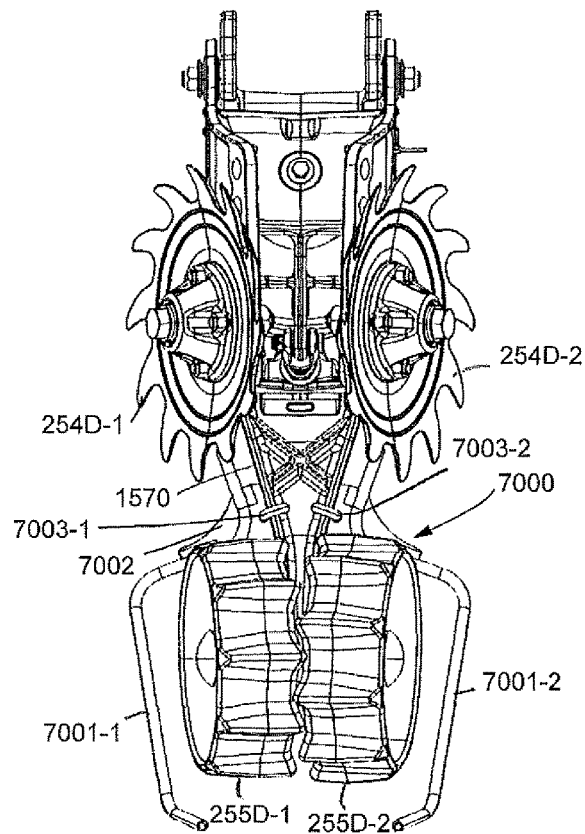
FIG. 30
FIG. 31 of FIG. 22.

FLUID APPLICATOR FOR TRENCH CLOSING ASSEMBLY

CROSS REFERENCE TO RELATED APPLICATION

This application claims the benefit of U.S. Provisional Application No. 62/985,094, filed Mar. 4, 2020, which is hereby incorporated by reference in its entirety.

BACKGROUND

It is well known that good seed-to-soil contact within the seed trench is a critical factor in uniform seed emergence and high yields. To obtain good seed-to-soil contact, once seeds are planted in a seed trench, the seed trench needs to be closed so that soil surrounds the seed.

BRIEF DESCRIPTION OF THE DRAWINGS

FIG. 8 is a bottom perspective view of the trench closing assembly of FIG. 7 with some parts removed.

FIG. 9 is a bottom perspective view of the trench closing assembly of FIG. 8 with some parts removed.

FIG. 14 is top perspective view of the frame of the trench closing assembly of FIG. 3.

FIG. 15 is a bottom perspective view of the frame of FIG. 14.

FIG. 16 is a top perspective view of the connection bracket of the frame of FIG. 14.

FIG. 17 is a bottom perspective view of the connection bracket of FIG. 16.

FIG. 20 is top perspective view of the mounting arm of the trench closing assembly of FIG. 3.

FIG. 21 is a bottom perspective view of the mounting arm of FIG. 20.

FIG. 29 is a right side elevation view of the trench closing assembly of FIG. 28.

FIG. 30 is a top plan view of the trench closing assembly of FIG. 28.

FIG. 31 is a bottom plan view of the trench closing assembly of FIG. 28.

DESCRIPTION

All references cited herein are hereby incorporated by reference in their entireties. In the event of a conflict in a definition in the present disclosure and that of a cited reference, the present disclosure controls.

Figure 1:
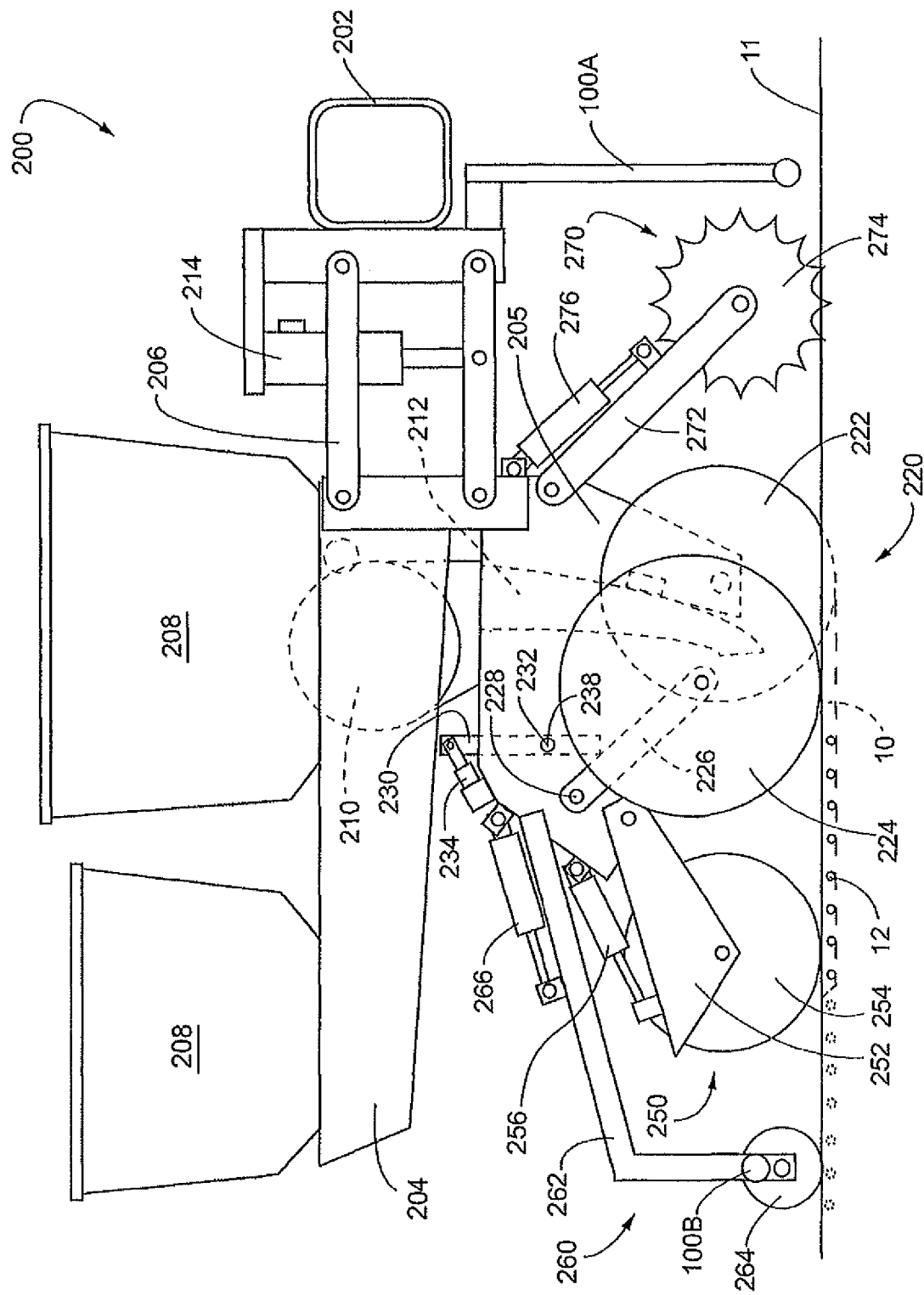
FIG. 1 is a side elevation view of an embodiment of a row unit of an agricultural planter.

Referring now to the drawings, wherein like reference numerals designate identical or corresponding parts throughout the several views, FIG. 1 illustrates an embodiment of an agricultural planter row unit 200. The row unit 200 is comprised of a frame 204 pivotally connected to a toolbar 202 by a parallel linkage 206 enabling each row unit 200 to move vertically independently of the toolbar 202. The frame 204 operably supports one or more hoppers 208, a seed meter 210, a seed delivery mechanism 212, a downforce control system 214, a seed trench opening assembly 220, a trench closing assembly 250, an optional packer wheel assembly 260, and an optional row cleaner assembly 270. It should be understood that the row unit 200 shown in FIG. 1 may be for a conventional planter or the row unit 200 may be a central fill planter, in which case the hoppers 208 may be replaced with one or more mini-hoppers and the frame 204 modified accordingly as would be recognized by those of skill in the art.

The optional downforce control system 214 is disposed to apply lift and/or downforce on the row unit 200 such as disclosed in U.S. Publication No. US2014/0090585. The downforce applied by downforce control system 214 can be determined by methods disclosed in U.S. Pat. No. 9,173,339.

The seed trench opening assembly 220 includes a pair of opening discs 222 rotatably supported by a downwardly extending shank member 205 of the frame 204. The opening discs 222 are arranged to diverge outwardly and rearwardly so as to open a v-shaped trench 10 in the soil 11 as the planter traverses the field. The seed delivery mechanism 212, such as a seed tube or seed conveyor, is positioned between the opening discs 222 to deliver seed from the seed meter 210 into the opened seed trench 10. The depth of the seed trench 10 is controlled by a pair of gauge wheels 224 positioned adjacent to the opening discs 222. The gauge wheels 224 are rotatably supported by gauge wheel arms 226 which are pivotally secured at one end to the frame 204 about pivot pin 228. A rocker arm 230 is pivotally supported on the frame 204 by a pivot pin 232. It should be appreciated that rotation of the rocker arm 230 about the pivot pin 232 sets the depth of the trench 10 by limiting the upward travel of the gauge wheel arms 226 (and thus the gauge wheels) relative to the opening discs 222. The rocker arm 230 may be adjustably positioned via a linear actuator 234 mounted to the row unit frame 204 and pivotally coupled to an upper end of the rocker arm 230. The linear actuator 234 may be controlled remotely or automatically actuated as disclosed, for example, in International Publication No. WO2014/186810.

An optional downforce sensor 238 is configured to generate a signal related to the amount of force imposed by the gauge wheels 224 on the soil. In some embodiments the pivot pin 232 for the rocker arm 230 may comprise the downforce sensor 238, such as the instrumented pins disclosed in U.S. Pat. No. 8,561,472.

An optional seed meter 210 may be any commercially available seed meter, such as a finger-type meter or a vacuum seed meter. One exemplary vacuum seed meter is the VSet® meter, available from Precision Planting LLC, 23207 Townline Rd, Tremont, IL 61568.

An optional packer wheel assembly 260 comprises an arm 262 pivotally attached to the row unit fame 204 and extends rearward of the closing wheel assembly 250 and in alignment therewith. The arm 262 rotatably supports a packer wheel 264. An actuator 266 is pivotally attached at one end to the arm 262 and at its other end to the row unit frame 204 to vary the amount of downforce exerted by the packer wheel 264 to pack the soil over the seed trench 10.

An optional row cleaner assembly 270 may be the CleanSweep® system available from Precision Planting LLC, 23207 Townline Rd, Tremont, IL 61568. The row cleaner assembly 270 includes an arm 272 pivotally attached to the forward end of the row unit frame 204 and aligned with the trench opening assembly 220. A pair of row cleaner wheels 274 are rotatably attached to the forward end of the arm 272. An actuator 276 is pivotally attached at one end to the arm 272 and at its other end to the row unit frame 204 to adjust the downforce on the arm to vary the aggressiveness of the action of the row cleaning wheels 274 depending on the amount of crop residue and soil conditions.

Figure 2:
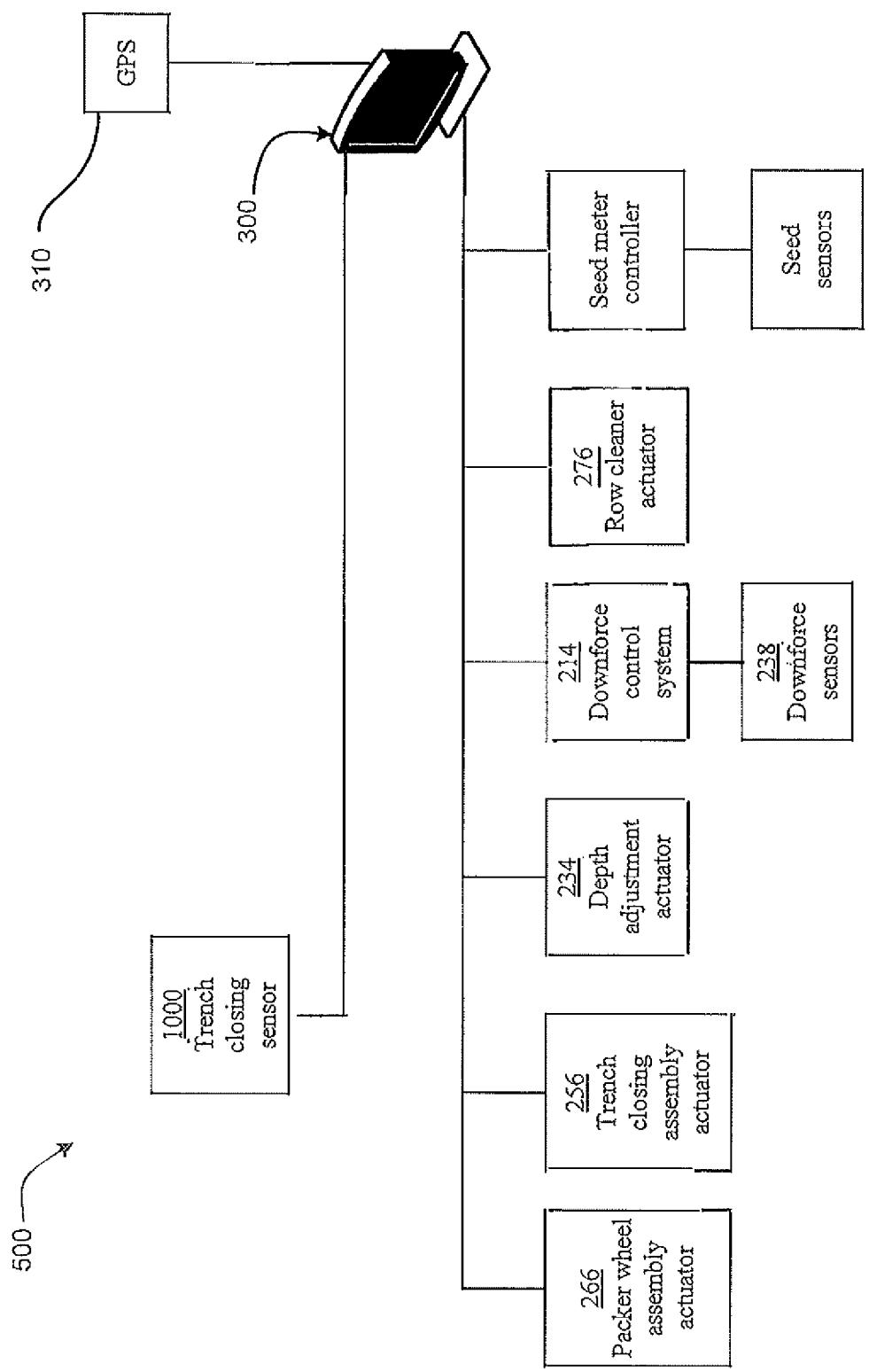
FIG. 2 is a diagram of a system for implementing operational control of the closing wheel assembly based on signals generated by the trench closing sensor.
Figure 3:
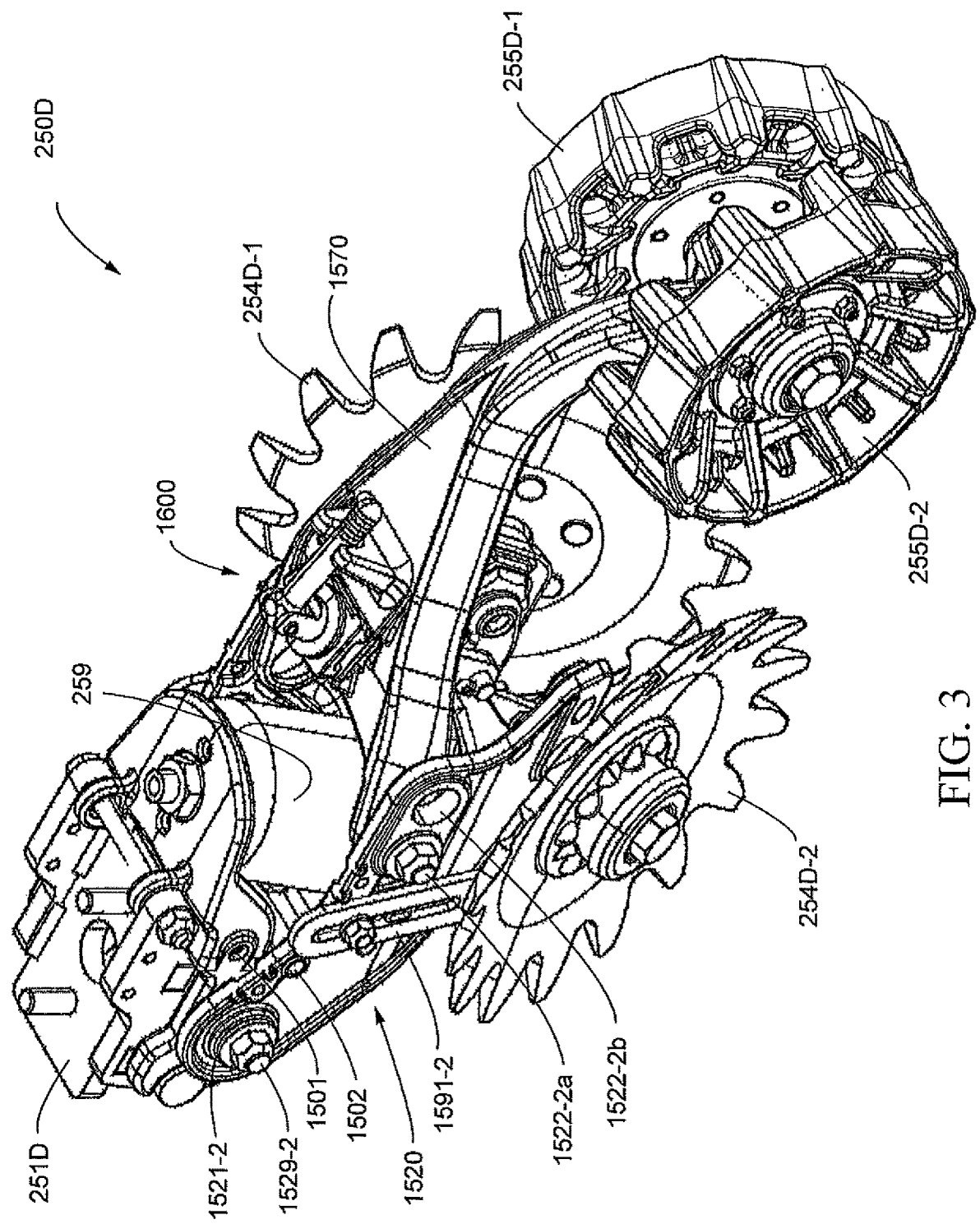
FIG. 3 is a left side perspective view of an embodiment of a trench closing assembly.

Referring to FIG. 2, a monitor 300 is visible to an operator within the cab of a tractor pulling the planter. The monitor 300 may be in signal communication with a GPS unit 310, the trench closing assembly actuator 256 and the optional packer wheel assembly actuator 266 to enable operational control of the trench closing assembly 250 and the optional packer wheel assembly 260 based on the signals generated by trench closing sensors 1000, which are described in International Publication No. WO2017/197274. Also as discussed later, the monitor 300 may be programmed to display operational recommendations based on the signals generated by the trench closing sensors 1000. The monitor 300 may also be in signal communication with the row cleaner actuator 276, the downforce control system 214, the depth adjustment actuator 234 to enable operational control of row cleaner assembly 270, the downforce control system 214 and the trench opening assembly 230, respectively.

Trench Closing Assembly

Examples of Trench Closing Assemblies can be found in PCT Publication No. WO2019169369 and U.S. Patent Application Nos. 62/831,338 filed 9 Apr. 2019; 62/967,293 filed 29 Jan. 2020; 62/843,037, filed 3 May 2019; and 62/866,700, filed 26 Jun. 2019. Also, an example of a trench closing assembly is the FurrowForce™ trench closing assembly available from Precision Planting, LLC.

FIGS. 3-27 illustrate a trench closing assembly 250D according to an embodiment. In this embodiment, trench closing assembly 250D has a main frame 251D that is connected to row unit 200. Trench closing assembly 250D has a frame 1520, an actuator 259, a pair of closing wheels 254D-1, 254D-2, and, optionally, a press wheel 255D.

Turning to FIGS. 14-19, frame 251D has a connection bracket 1540 and an attachment bracket 1550. Connection bracket 1540 can have one or more bolts 1209D extending through apertures 1207D in connection bracket 1540 for mounting the frame 251D to the row unit 200. Connection bracket 1540 (as with connection brackets 1200 and 1201A) can be varied to mate attachment to different styles of row units. Connection bracket 1540 has a first side 1542-1, a second side 1542-2, and a plate 1543 disposed between first side 1542-1 and second side 1542-2. First side 1542-1 and second side 1542-2 each have a post 1541-1 and 1541-2, respectively, protruding perpendicularly outward.

Attachment bracket 1550 connects to connection bracket 1540. Attachment bracket 1550 provides a common structure for mounting other parts while connection bracket 1540 has a varied structure to mate with different styles of row units. Attachment bracket has a first side 1552-1, a second side 1552-2, a crossbar 1557 disposed between first side 1552-1and second side 1552-2, and plate 1553 disposed between first side 1552-1and second side 1552-2, and plate 1553. First side 1552-1 and second side 1552-2 each have a u-shaped opening 1555-1 and 1555-2, respectively, for connection to posts 1541-1 and 1541-2, respectively. First side 1552-1 and second side 1552-2 have openings 1558-1 and 1558-2, respectively, for accepting pivots 1529-1 and 1529-2, respectively. Attachment bracket 1550 can be secured to connection bracket with fastener 1549. Optionally, attachment bracket 1550 can also have an opening 1501 disposed in first side 1552-1 or second side 1552-2 for accepting a pin. While connection bracket 1540 is illustrated with separate parts it may be fabricated as a unitary part.

Figures 4, 5:
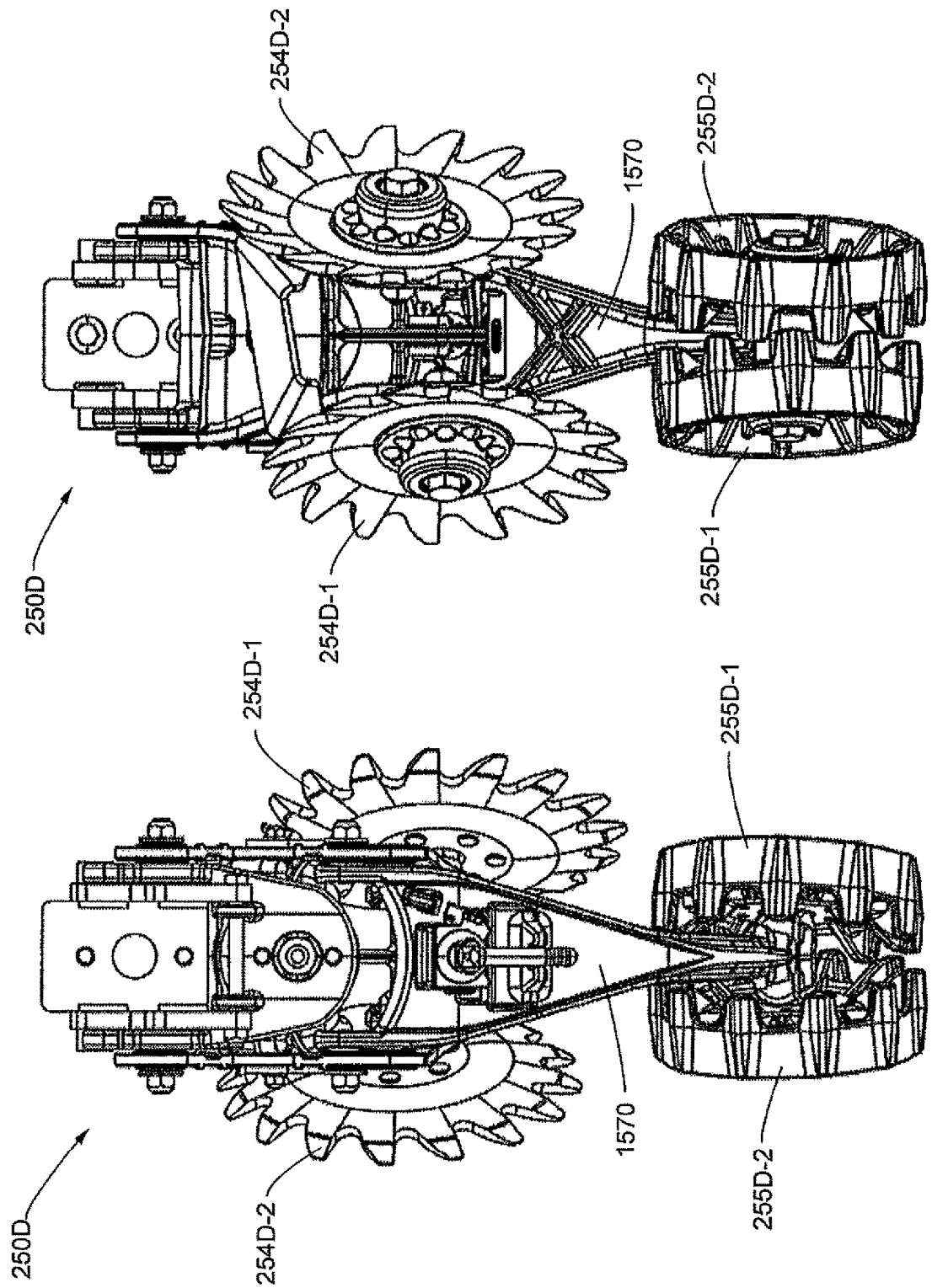
FIG. 4 is a top plan view of the trench closing assembly of FIG. 3.
FIG. 5 is a bottom plan view of the trench closing assembly of FIG. 3.
Figure 7:
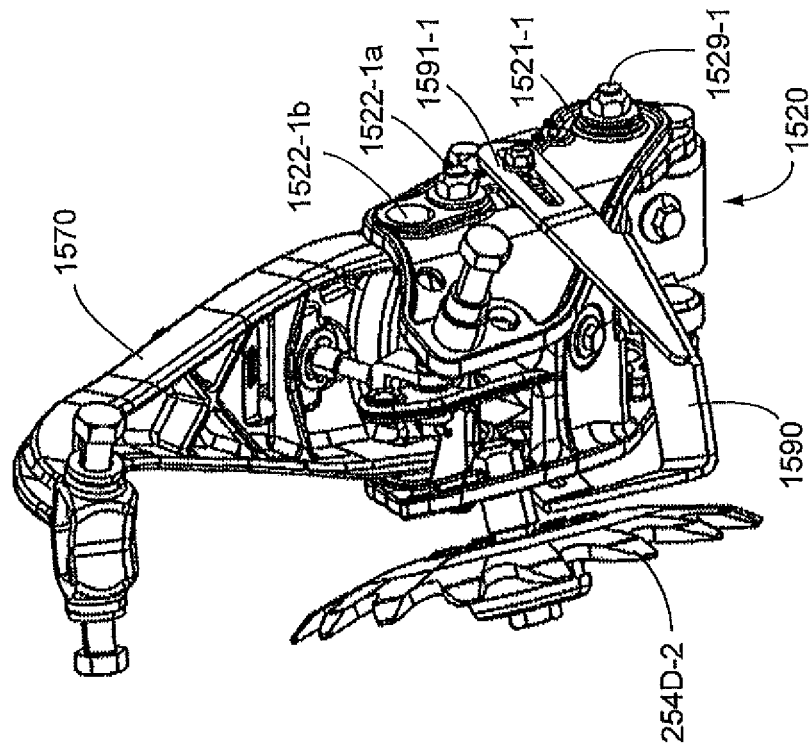
FIG. 7 is a bottom perspective view of the trench closing assembly of FIG. 6.
Figure 6:
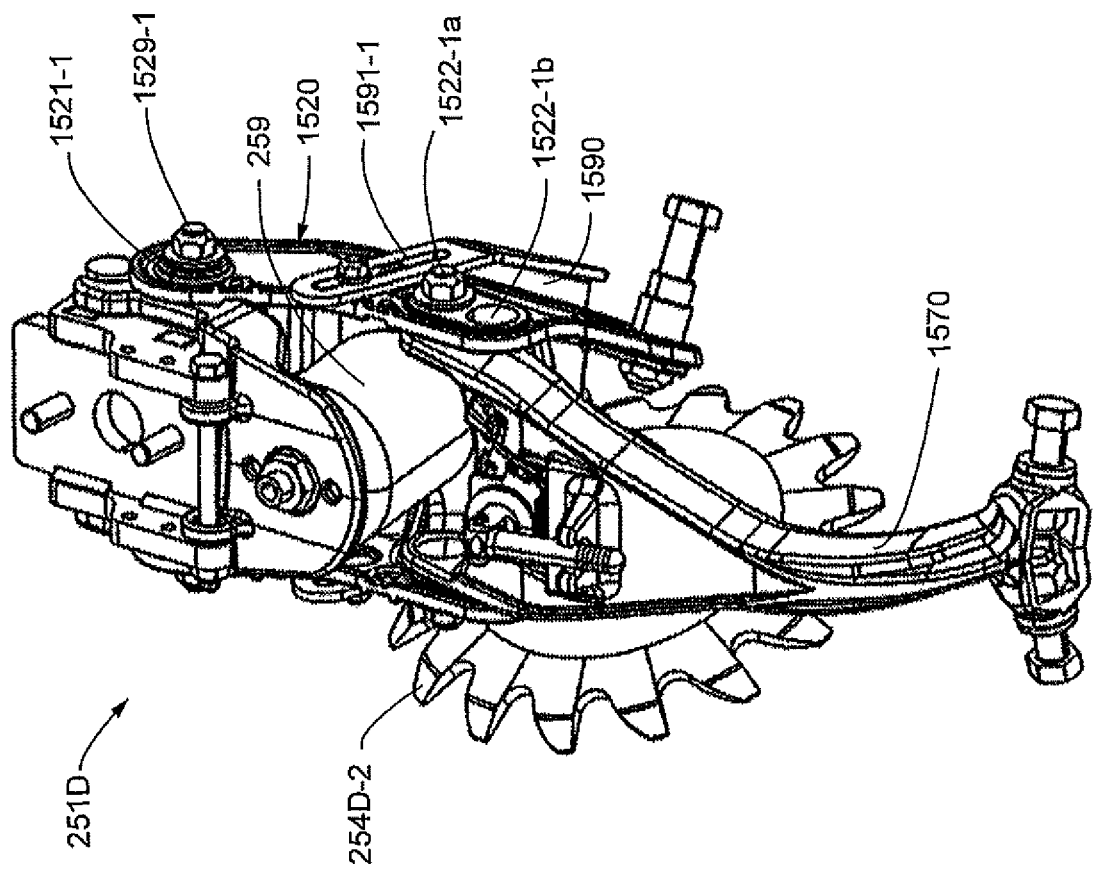
FIG. 6 is a top perspective view of the trench closing assembly of FIG. 3 with some parts removed.
Figures 10, 11:
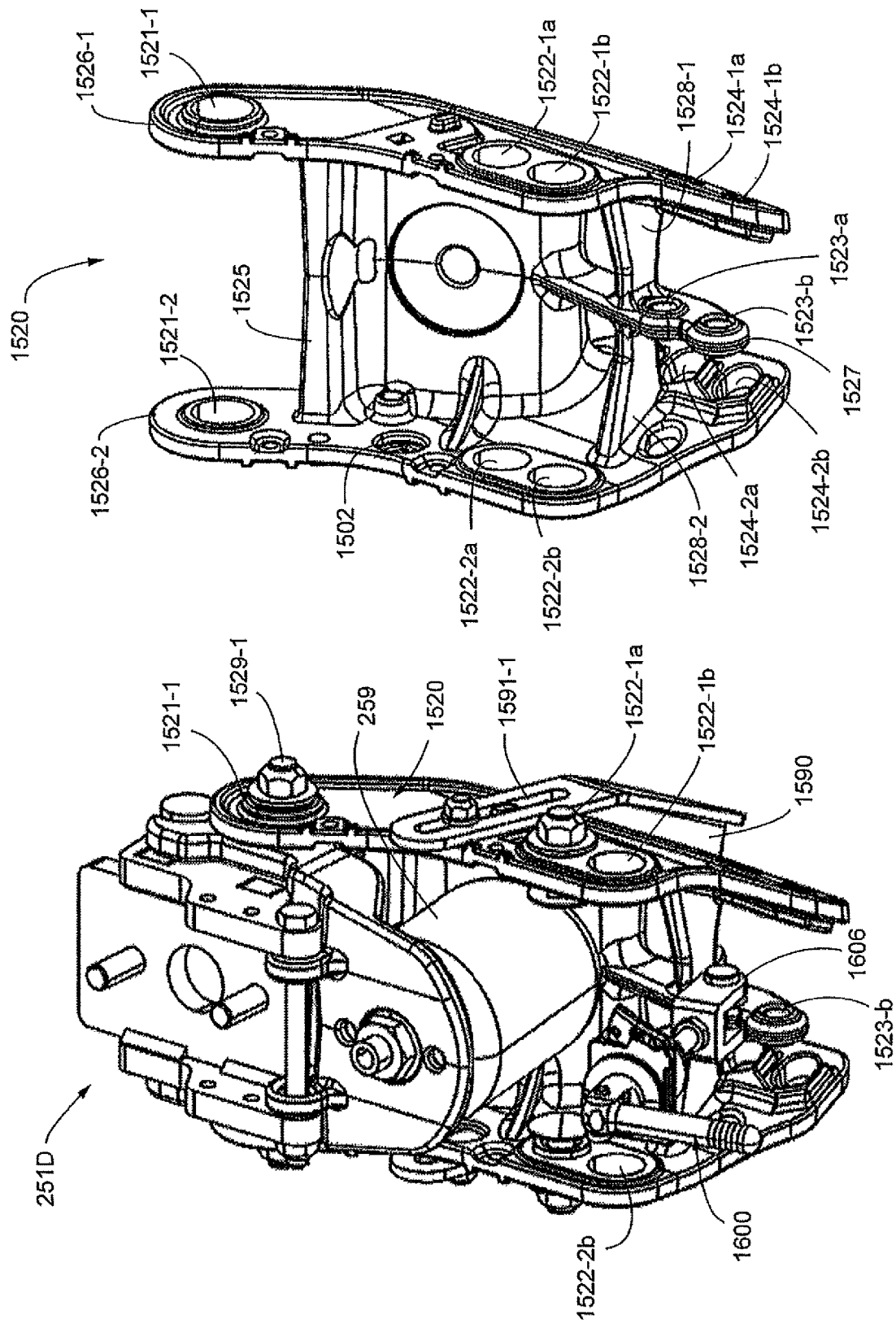
FIG. 10 is a top perspective view of the trench closing assembly of FIG. 9.
FIG. 11 is a top perspective view of the frame of the trench closing assembly of FIG. 3.
Figure 13:
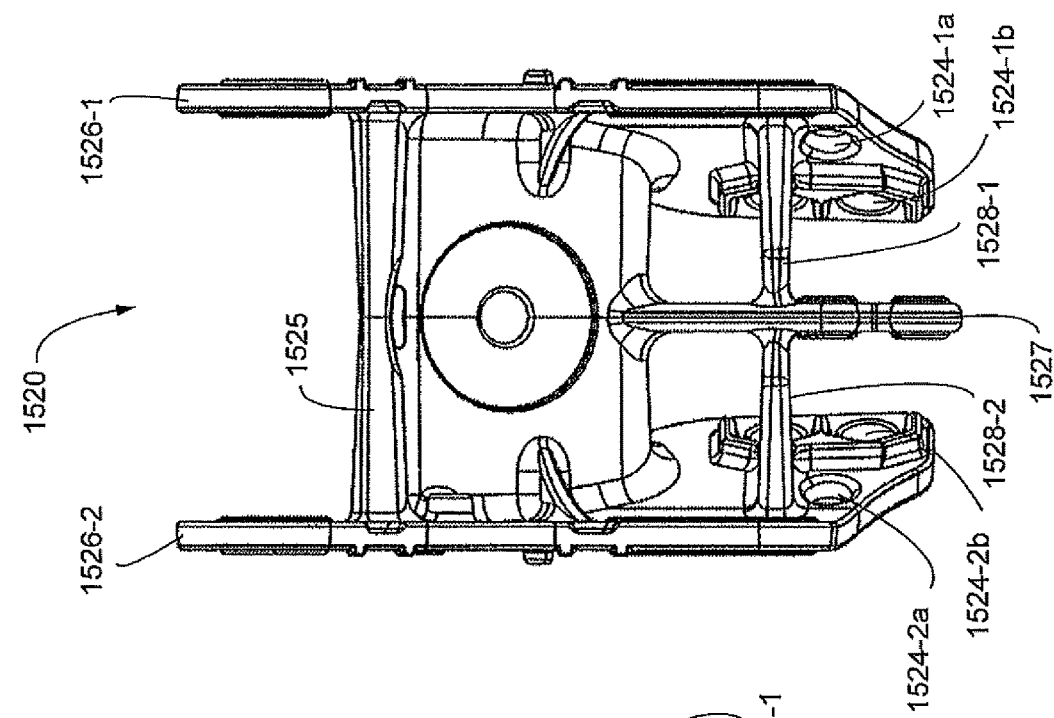
FIG. 13 is bottom plan view of the frame of FIG. 11.
Figure 12:
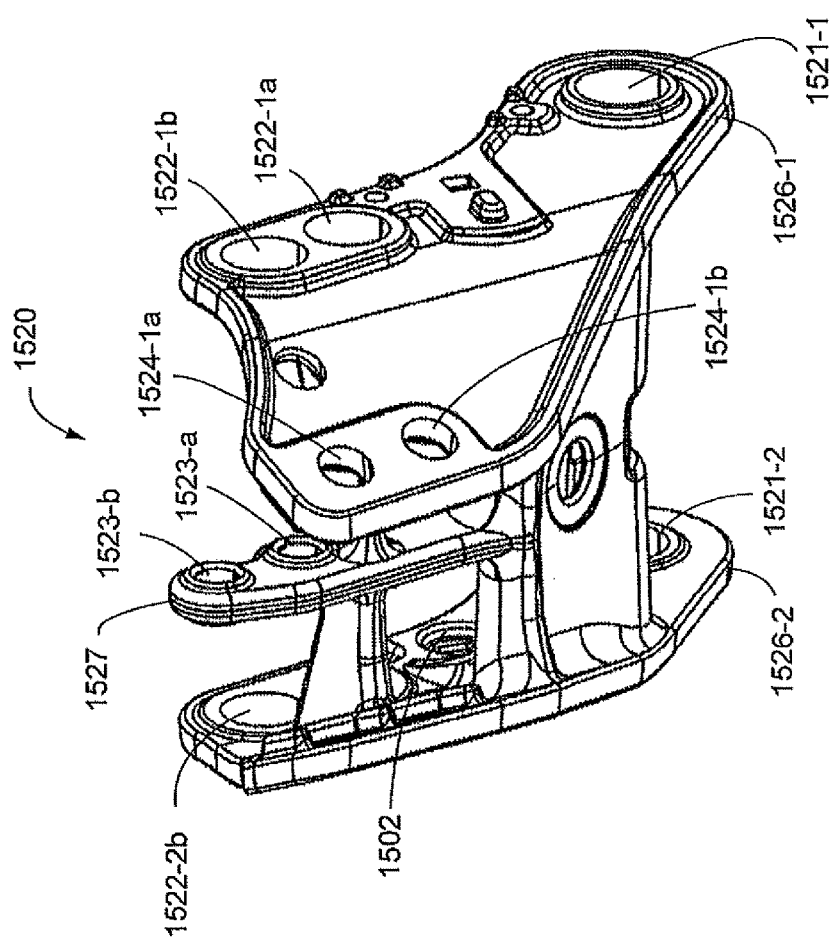
FIG. 12 is a bottom perspective view of the frame of FIG. 11.
Figures 18, 19:
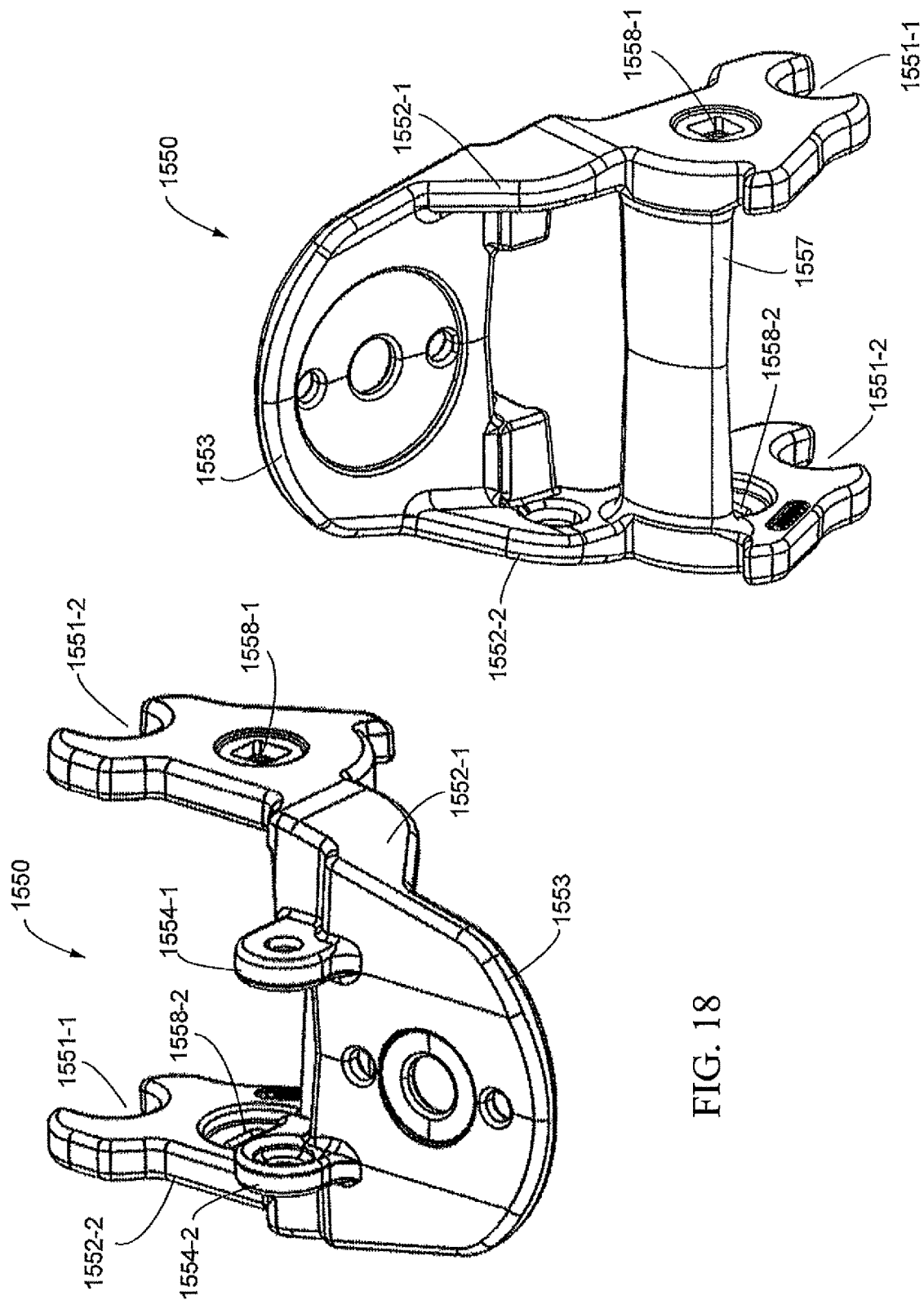
FIG. 18 is a top perspective view of the attachment bracket of the frame of FIG. 14.
FIG. 19 is a bottom perspective view of the attachment bracket of FIG. 15.
Figure 23:
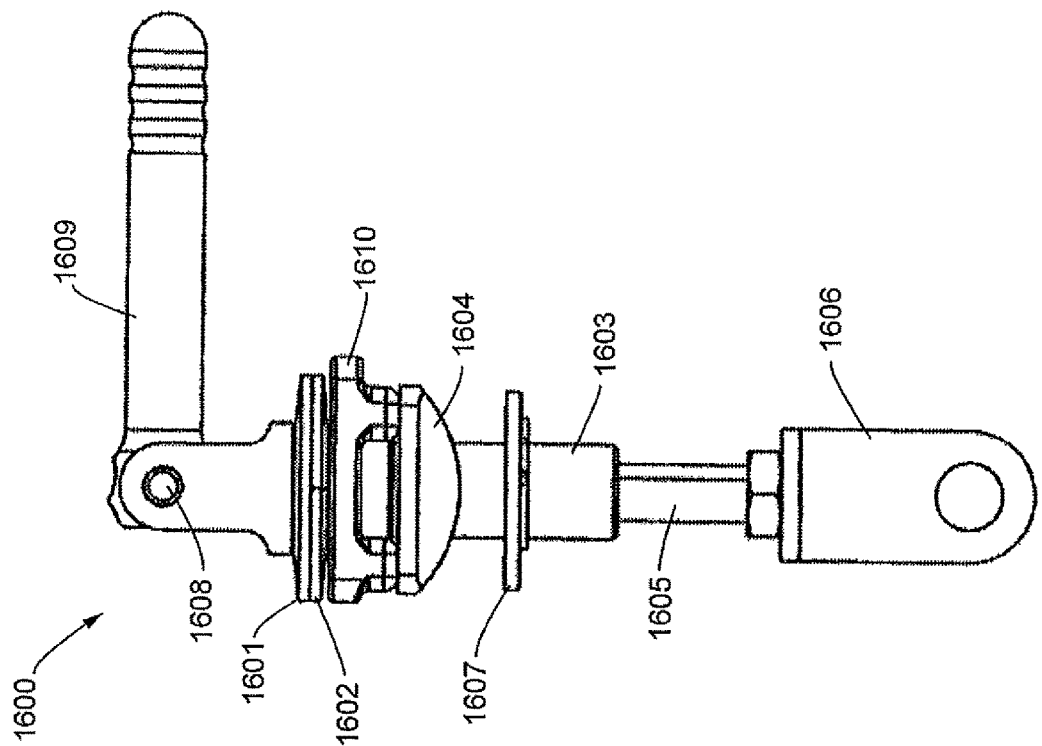
FIG. 23 is a left side elevation view of the handle assembly of FIG. 22.
Figure 22:
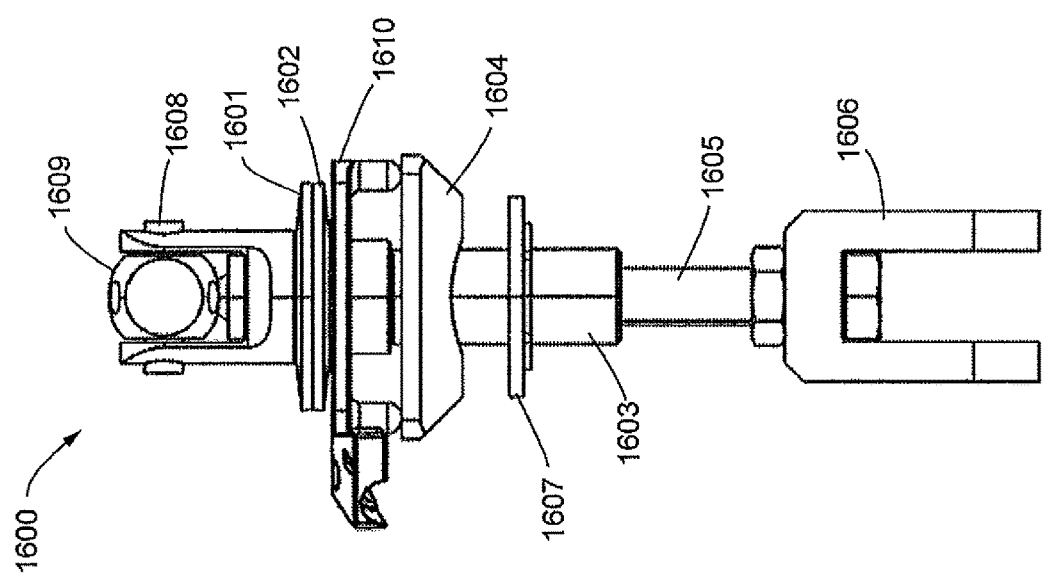
FIG. 22 is a front elevation view of the handle assembly of the trench closing assembly of FIG. 3.
Figure 26:
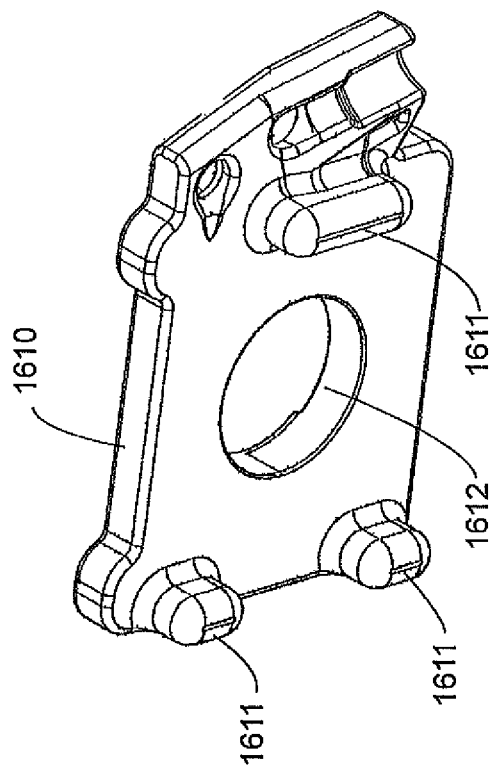
FIG. 26 is a top perspective view of the pressure sensor of FIG. 25.
Figure 25:
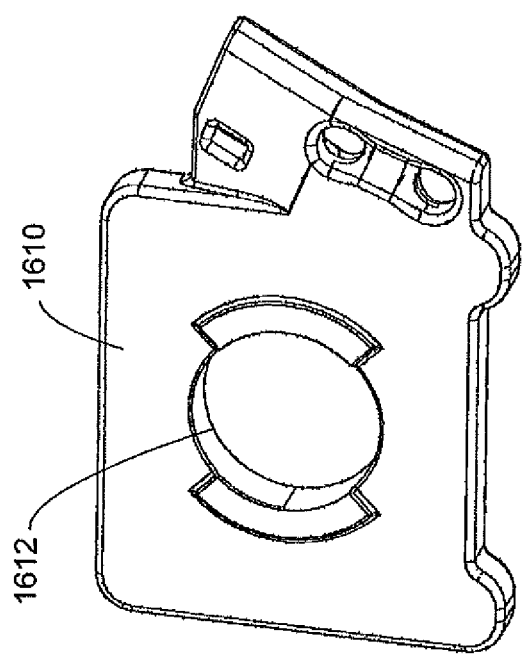
FIG. 25 is a bottom perspective view of the pressure sensor of the handle assembly of FIG. 22.
Figure 24:
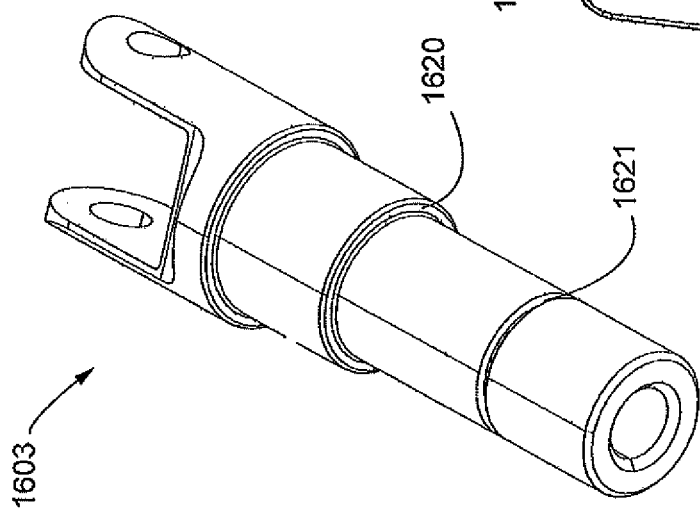
FIG. 24 is a perspective view of the shank of the handle assembly of FIG. 22.
Figure 27:
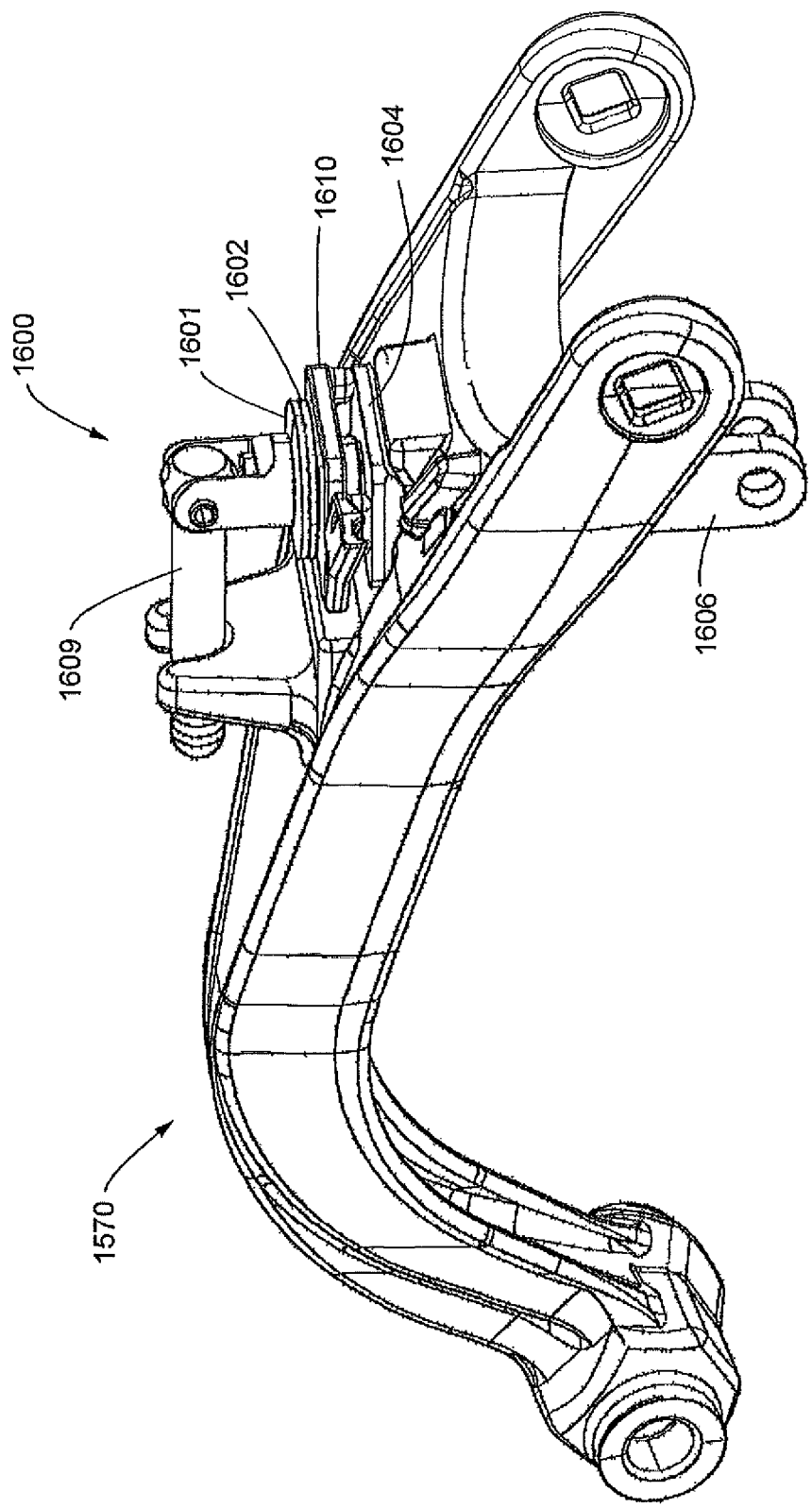
FIG. 27 is a perspective view of the handle assembly and mounting arm of the trench closing assembly of FIG. 3.
Figure 28:
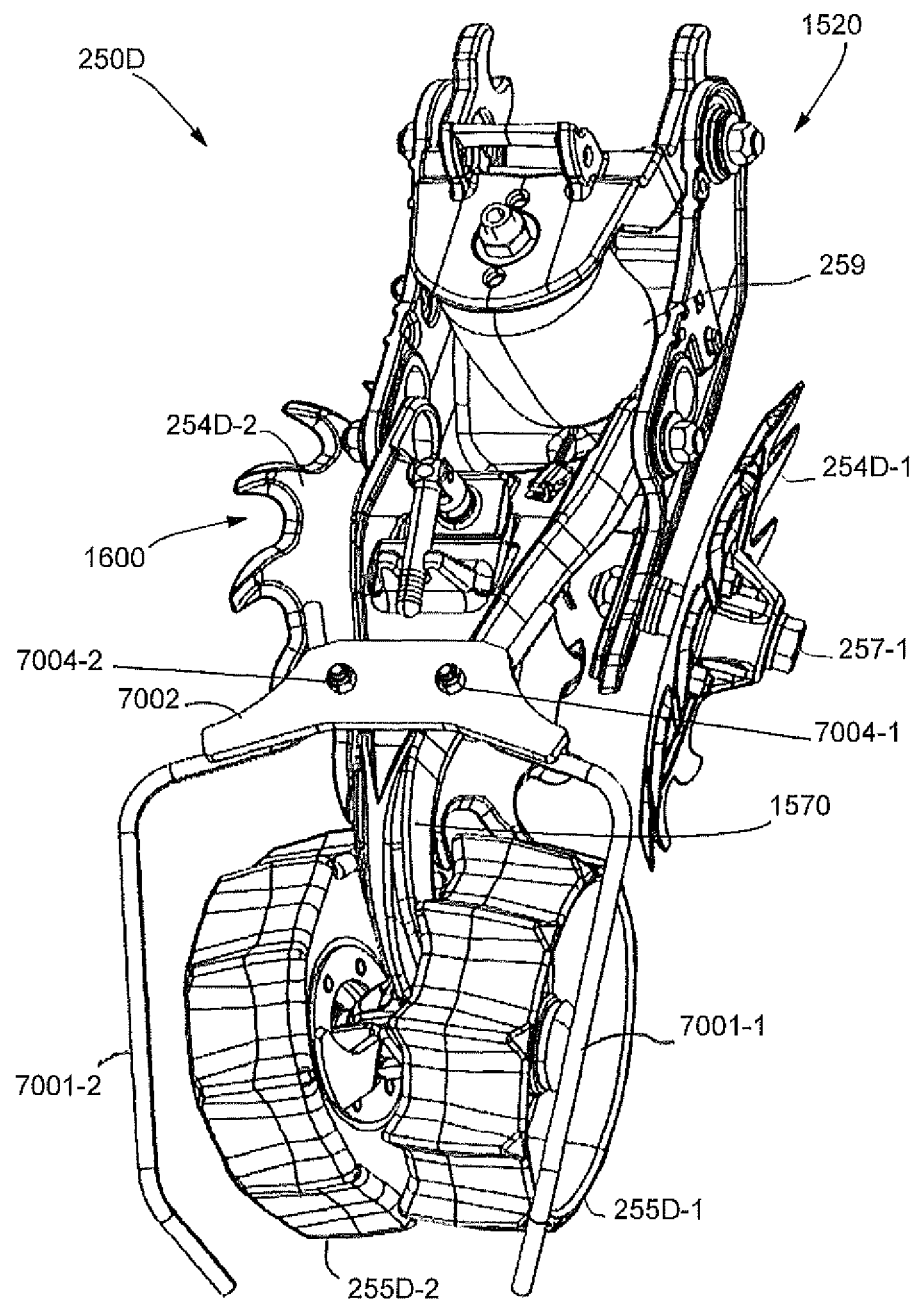
FIG. 28 is a perspective view of the trench closing assembly of FIG. 3 further including a fluid applicator according to an embodiment.
Figure 32:
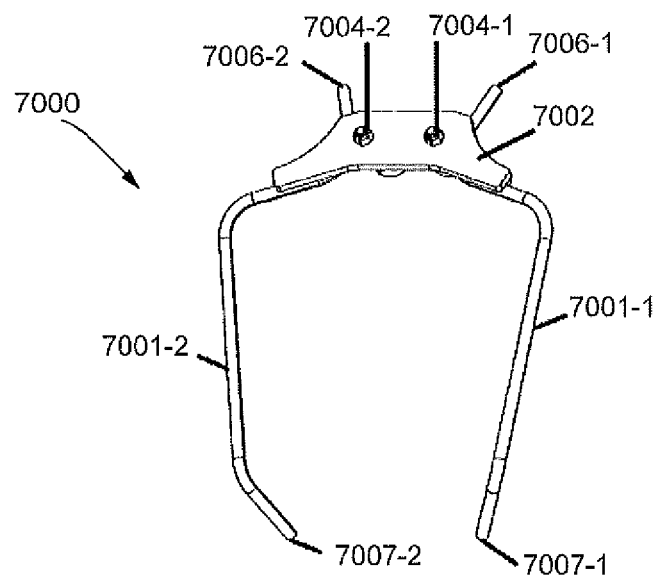
FIG. 32 is a perspective view of the fluid applicator of FIG. 28.
Figure 33:
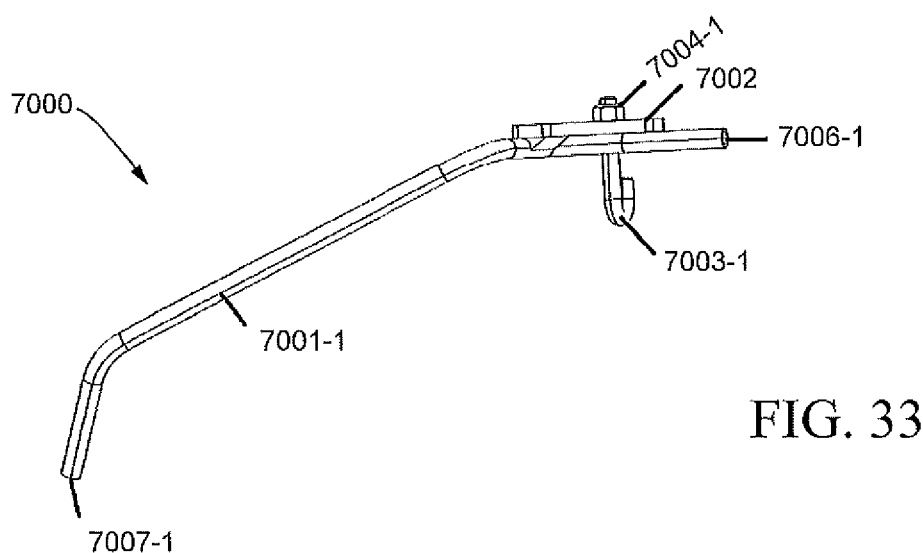
FIG. 33 is a right side elevation view of the fluid applicator of FIG. 32.
Figure 34:
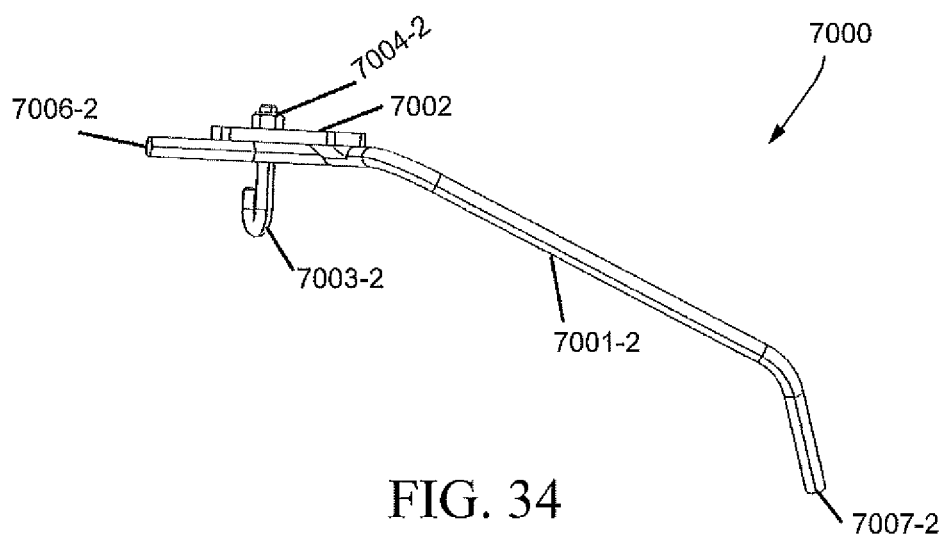
FIG. 34 is a left side elevation view of the fluid applicator of FIG. 32.
Figure 35:
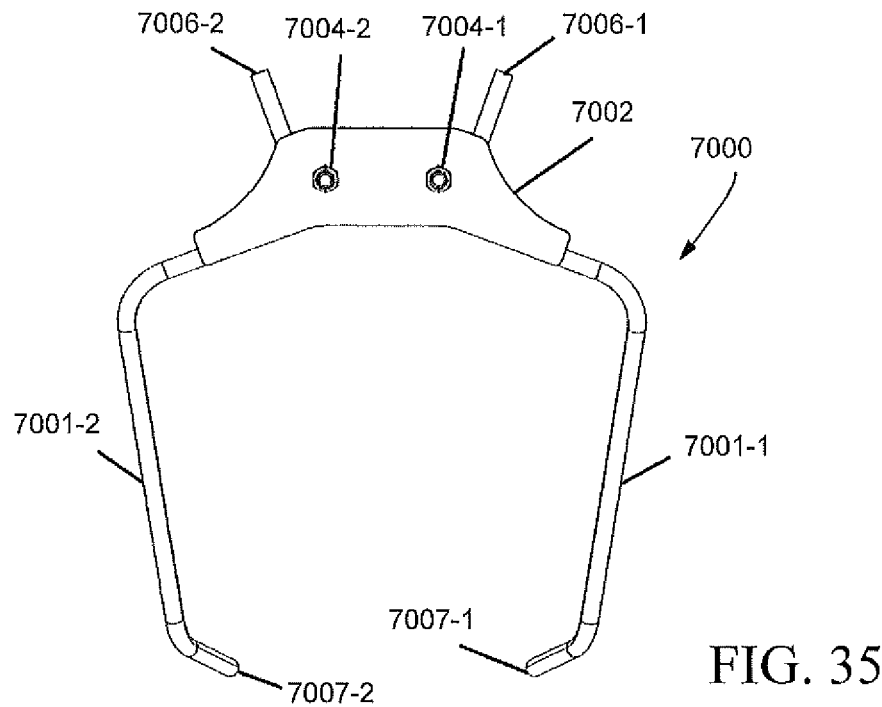
FIG. 35 is a top plan view of the fluid applicator of FIG. 32.
Figure 36:
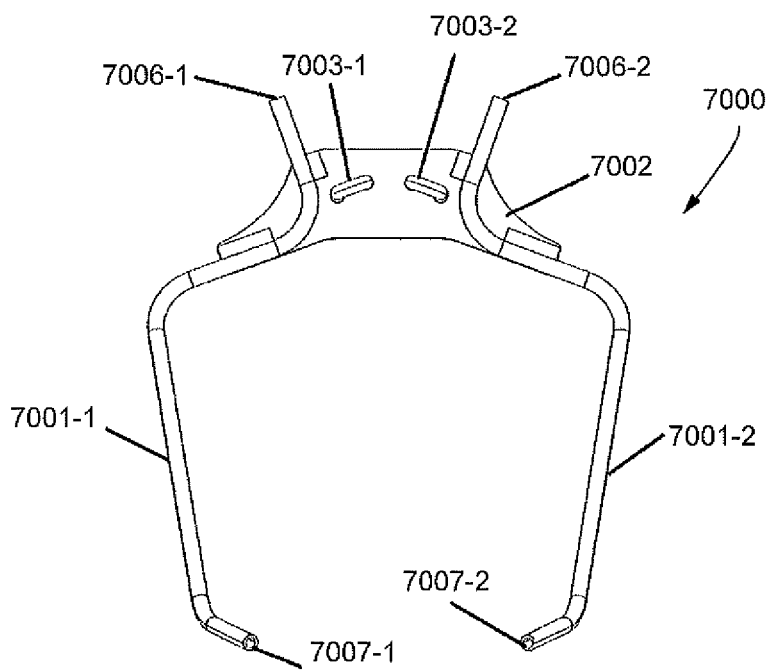
FIG. 36 is a bottom plan view of the fluid applicator of FIG. 32.
Figure 37:
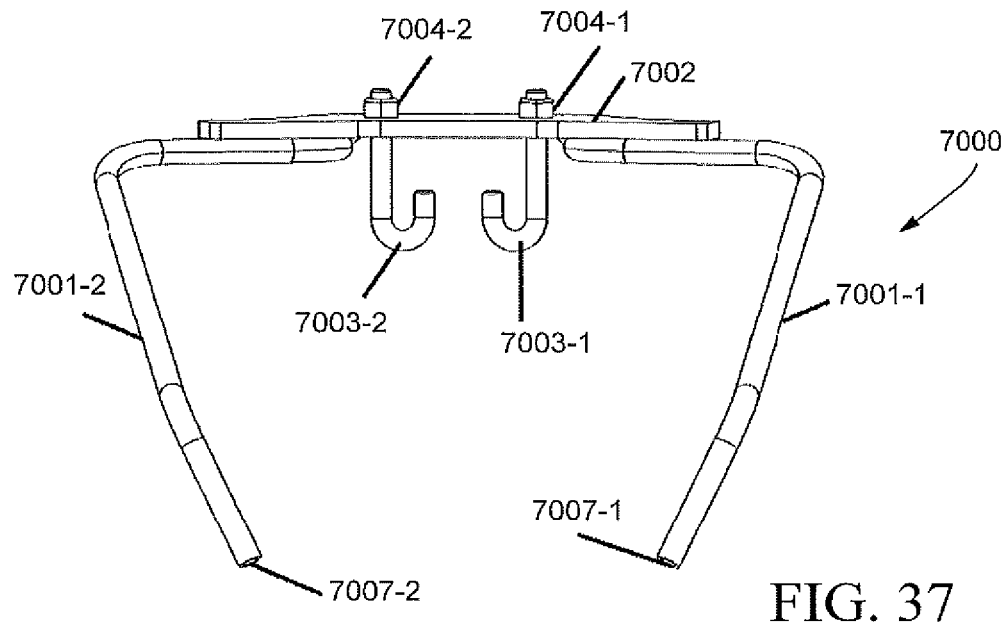
FIG. 37 is a back side elevation view of the fluid applicator of FIG. 32.
Figure 38:
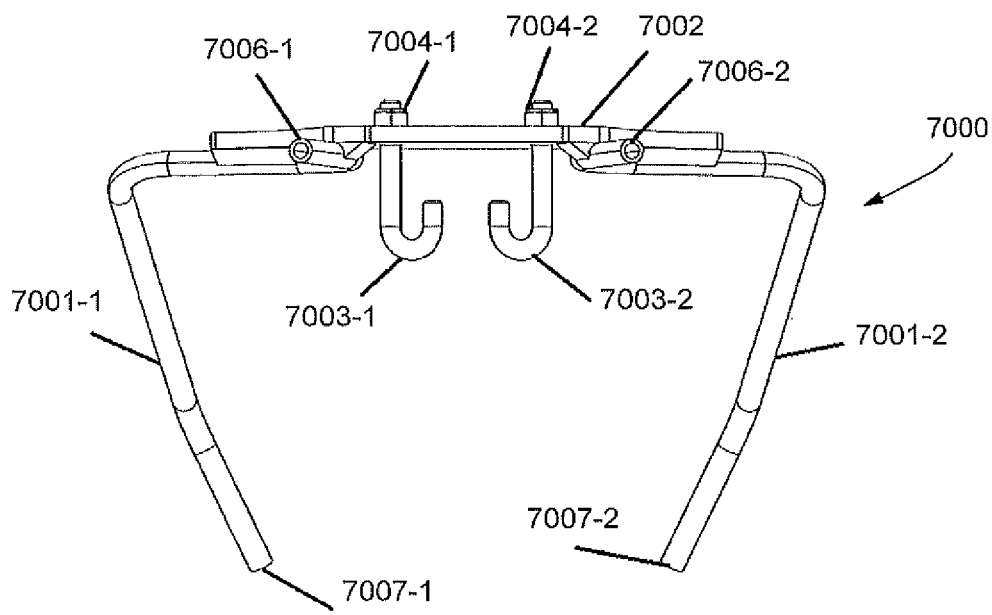
FIG. 38 is a front side elevation view of the fluid applicator of FIG. 32.

Optionally, as illustrated in FIGS. 5 and 7, a guard 1590 can be disposed on frame 1520 ahead of closing wheels 254D-1, 254D-2. Guard 1590 can prevent rocks, rootballs, or other trash from approaching closing wheels 254D-1, 254D-2. The height of guard 1590 can be adjusted by changing the placement of arms 1591-1 and 1591-2 on frame 1520.

Turning to FIGS. 20-21, mounting arm 1570 has a first side 1571-1, a second side 1571-2, a plate 1574 disposed between first side 1571-1 and second side 1571-2, a hole 1573 through plate 1574 for passage of sleeve 1603, axle hubs 1575-1 and 1575-2 for mounting press wheels 255D-1 and 255D-2, respectively, and, optionally, a handle cradle 1579.

Turing to FIGS. 6-13, frame 1520 is pivotally connected to frame 251D through pivots 1529-1 and 1529-2. Frame 1520 has a first side 1526-1 and a second side 1526-2, a plate 1525 connecting first side 1526-1 and second side 1526-2, a connection arm 1527 extending rearwardly along the direction of travel from plate 1525, a cross-brace 1528-1 connecting connection arm 1527 to first arm 1526-1, a cross-brace 1528-2 connecting connection arm 1527 to second arm 1526-2. First side 1526-1 and second side 1526-2 have openings 1521-1 and 1521-2 for disposing about pivots 1529-1 and 1529-2, respectively. Mounting arm 1570 can attach to frame 1520 at connections 1522-1*a* and 1522-2*a* or to 1522-1*b* and 1522-2*b*. The plurality of connections allows the distance between closing wheels 254D-1, 254D-2, and press wheel 255D (255D-1, 255D-2) to be changed. There can be one connection 1522 or a plurality of connections 1522. As the mounting arm 1570 position is changed, there are also corresponding connections 1523-*a* and 1523-*b* (matching in number to connection 1522) for connecting handle assembly 1600 to frame 1520. Frame 1520 also has connections 1524 (1524-1*a*, 1524-1*b*, 1524-2*a*, and 1524-2*b*) for mounting closing wheels 254D-1, 254D-2. While there can be one set of connections 1524, the plurality of connections 1524 allow for forward and back placement of the closing wheels 254D-1, 254D-2 on frame 1520, or closing wheels 254D-1, 254D-2 can be offset from each other with one closing wheels 254D-1, 254D-2 being mounted to a forward location (the "a" position) or to a rear location (the "b" position). As illustrated, closing wheels 254D-1, 254D-2 are offset from each other. Optionally, frame 1520 can have an opening 1502 in either the first side 1526-1 or second side 1526-2 (shown in 1526-2) for accepting a pin. Frame 1520 can be raised to allow opening 1501 and opening 1502 to align for accepting a pin (not shown). This allows trench closing assembly 250D to be raised for transport or when closing is not needed. While illustrated on one side, openings 1501 and 1502 can be disposed on both sides.

Actuator 259 is disposed between plate 1525 and plate 1553 to apply a force to plate 1553 to cause frame 1520 to pivot and apply pressure to closing wheels 254D-1 and 254D-2.

Turning to FIGS. 22-27, handle assembly 1600 is illustrated. Handle assembly 1600 has a sleeve 1603 having a first diameter 1620 and a second diameter 1621. Second diameter 1621 is small enough to be disposed through load sensor 1610, and first diameter 1620 is large enough so that it cannot pass through load sensor 1610. Sleeve 1603 has a bracket 1622 (u-shaped bracket as illustrated or any other shape) for accepting handle 1609. Disposed on sleeve 1603 below bracket 1622 are bevel washers 1601 and 1602. Bevel washer 1601 and bevel washer 1602 are disposed with their concave surfaces facing each other. This allows bevel washers 1601 and 1602 to flex to absorb shocks experienced by trench closing assembly 250D to prevent overloading of load sensor 1610. Before bevel washers 1601 and 1602 reach maximum flex, first diameter 1620 will contact plate 1604 to limit the travel. Load sensor 1610 is a pancake load sensor. Load sensor 1610 has a hole 1612 for passage of sleeve 1603. Disposed on the underside of load sensor 1610 are a plurality of feet 1611 to allow load sensor 1610 to flex and measure force. Load sensor 1610 can be disposed on mounting arm 1570 directly, or as shown, a plate 1604 can be disposed between load sensor 1610 and mounting arm 1570. Optionally, a washer 1607 can be disposed about sleeve 1603 under mounting arm 1570. Handle assembly 1600 is connected to frame 1520 at connection 1523-*a* or 1523-*b* with a bracket 1606 (u-shaped bracket) and a bolt 1605 connecting bracket 1606 with sleeve 1603. In the horizontal position, handle 1609 locks handle assembly 1600 in place against mounting arm 1570. In the vertical position, handle 1609 releases handle assembly from engagement with mounting arm 1570. Bolt 1605 can be adjusted to set a vertical placement of mounting arm 1570 relative to frame 1520.

Load sensor 1610 can be connected to a network directly through a plug (not shown) having a CAN processor to allow direct communication over a CAN network. The CAN processor can communicate pressure readings and provide control signals over the CAN network. Alternatively, load sensor 1610 can be connected to a control module (either an on-row module, or a module controlling a plurality of row) to communicate pressure readings that are then processed by the control module.

Fluid Applicator

Figure 39:
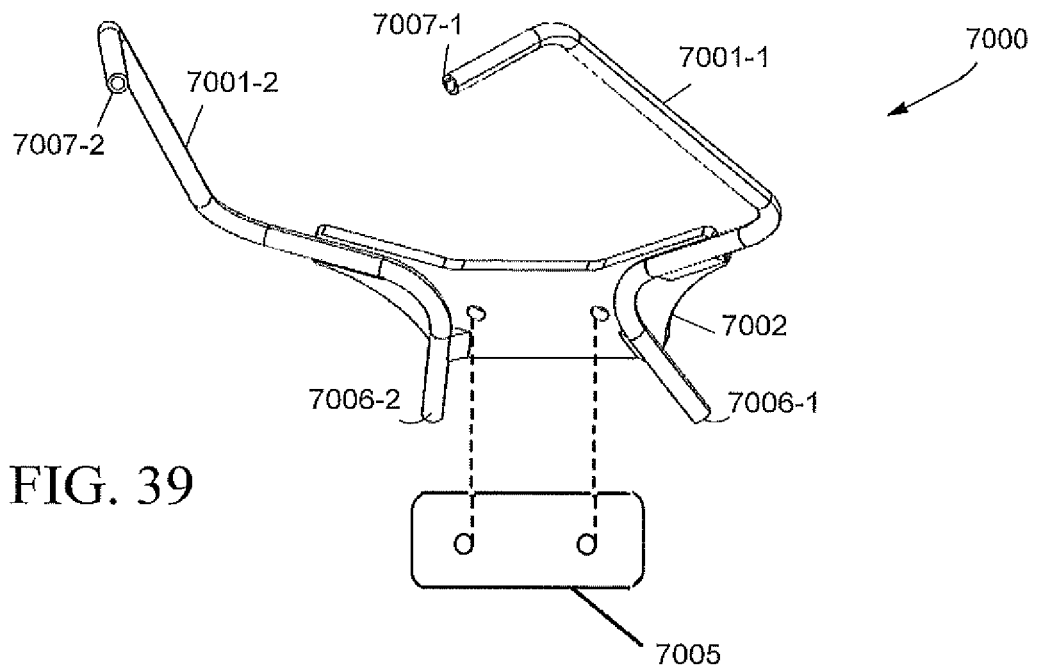
FIG. 39 is a bottom perspective view of another embodiment of the fluid applicator of FIG. 32.
Figure 40:
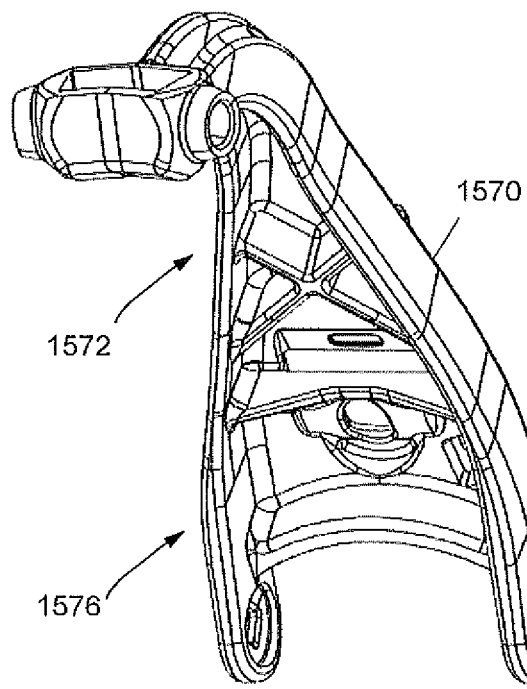
FIG. 40 is a bottom perspective view of the mounting arm of FIG. 28.

FIGS. 28-40 illustrate a fluid applicator 7000 that is connectable with mounting arm 1570. Fluid applicator has a bracket 7002 with at least one fluid conduit 7001 attached to the bracket. As illustrated, there are two fluid conduits 7001-1 and 7001-2. Each fluid conduit 7001 has a first end 7006 (7006-1, 7006-2) for connecting to a fluid source (not shown) and a second end 7007 (7007-1, 7007-2) for dispensing the fluid to a soil surface. Fluid conduits 7001-1 and 7001-2 can be shaped to extend transverse to trench closing assembly 250 to extend laterally beyond press wheel 255D (255D-1, 255D-2) and vertically downward from mounting arm 1570 toward the soil surface. While illustrated as a unitary part, fluid conduits 7001-1 and 7001-2 can be fabricated from multiple parts connected together. Bracket 7002 is connected to mounting arm 1570. Illustrated in FIGS. 28-38, J-bolts 7003 (7003-1, 7003-2) are connected with fasteners 7004 (7004-1, 7004-2), such as nuts, to bracket 7002 and engaged with mounting arm 1570. In one embodiment, mounting arm 1570 has a recess 1572 in its bottom, which is illustrated in FIG. 40, to receive J-bolts 7003 (7003-1, 7003-2). In another embodiment illustrated in FIG. 39, in place of J-bolts 7003, there can be a lower bracket 7005 for mounting to a bottom side 1576 of mounting arm 1570. Lower bracket 7005 and bracket 7002 are connected together with bolts (not shown). In another embodiment, either of the previous embodiments can be modified to replace J-bolts 7003-1, 7003-2 or bolts with a single U-bolt (not shown). In each embodiment, the bolts (J-Bolts 7003-1, 7003-2, bolts, or U-bolt) are not disposed through mounting arm 1570. The bolts (J-Bolts 7003-1, 7003-2, bolts, U-bolt) are disposed adjacent to first side 1571-1 and second side 1571-2.

Figure 41:
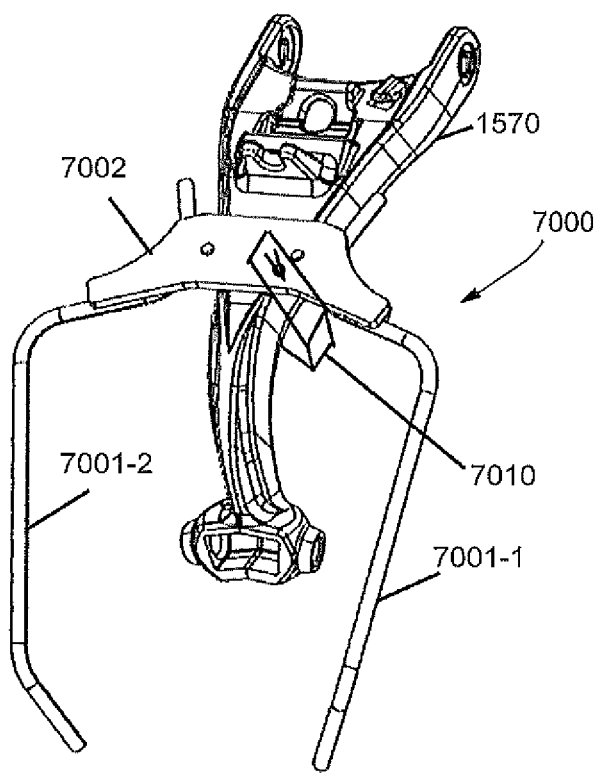
FIG. 41 is a perspective view of another connection for the fluid applicator to the mounting arm of FIG. 28.

In FIG. 41, fluid applicator 7000 is illustrated connected to mounting arm 1570 with a clamp 7010.

Various embodiments of the invention have been described above for purposes of illustrating the details thereof and to enable one of ordinary skill in the art to make and use the invention. The details and features of the disclosed embodiments are not intended to be limiting, as many variations and modifications will be readily apparent to those of skill in the art.

The invention claimed is:

1. A trench closing system for a row unit of an agricultural planter, the row unit having a row unit frame supporting an opener disk for opening a seed trench in a soil surface as the row unit travels in a forward direction of travel, the trench closing system comprising:
- a main frame supported by and extending rearwardly from the row unit frame;
- a frame member pivotally supported from the main frame;
- a pair of closing wheels each rotatably supported by the frame member with a first one of the pair of closing wheels disposed on a first side of the seed trench and a second one of the pair of closing wheels disposed on a second side of the seed trench, the pair of closing wheels cooperating with one another to close the opened seed trench with soil as the row unit travels in the forward direction of travel;
- a mounting arm pivotally mounted to the frame member, the mounting arm supporting a press wheel rearward of the closing wheels, the press wheel having an inner side disposed proximate to the frame member;
- a fluid applicator connected to the mounting arm, wherein the fluid applicator comprises a bracket and at least one fluid conduit connected to the bracket, wherein the bracket is connected with a first bolt arm disposed adjacent to a first side of the mounting arm and a second bolt arm disposed adjacent to a second side of the mounting arm.

2. The trench closing system of claim 1, wherein the fluid applicator comprises a first fluid conduit and a second fluid conduit.

3. The trench closing system of claim 1, wherein the first bolt arm and second bolt arm are each individually J-bolts and the J-bolts engage with a bottom side of the mounting arm.

4. The trench closing system of claim 1, wherein the first bolt arm and second bolt arm are each individually J-bolts and the J-bolts engage with a recess in a bottom side of the mounting arm.

5. The trench closing system of claim 1 further comprising a lower bracket for engaging a bottom side of the mounting bracket, and the lower bracket and the bracket are connected with the first bolt arm and the second bolt arm, and the first bolt arm and the second bolt arm are individual bolts.

6. The trench closing system of claim 1, wherein the first bolt arm and the second bolt arm are part of a U-bolt.

7. A trench closing system for a row unit of an agricultural planter,
the row unit comprising:
- a row unit frame supporting a pair of opening discs for opening a v-shaped seed trench in a soil surface as the row unit travels in a forward direction of travel;
- a pair of gauge wheels positioned adjacent to the pair of opening discs; and
- a seed meter disposed on the row unit and connected to a seed tube or a seed conveyor for depositing seeds into the v-shaped seed trench;

the trench closing system comprising:
- a main frame supported by and extending rearwardly from the row unit frame;
- a frame member pivotally supported from the main frame;
- a pair of closing wheels each rotatably supported by the frame member with a first one of the pair of closing wheels disposed on a first side of the seed trench and a second one of the pair of closing wheels disposed on a second side of the seed trench, the pair of closing wheels cooperating with one another to close the opened seed trench with soil as the row unit travels in the forward direction of travel;
- a mounting arm pivotally mounted to the frame member, the mounting arm supporting a press wheel rearward of the closing wheels, the press wheel having an inner side disposed proximate to the frame member;
- a fluid applicator connected to the mounting arm, wherein the fluid applicator comprises a bracket and at least one fluid conduit connected to the bracket, wherein the bracket is connected to the mounting arm with a clamp.

8. The trench closing system of claim 7, wherein the fluid applicator comprises a first fluid conduit and a second fluid conduit.

* * * * *